United States Patent [19]

Matsuse et al.

[11] Patent Number: 4,910,765
[45] Date of Patent: Mar. 20, 1990

[54] COMMUNICATION TERMINAL APPARATUS HAVING A RELAYING FUNCTION

[75] Inventors: Kenji Matsuse, Yokohama; Tomomi Gojyo, Hadano, both of Japan

[73] Assignee: Ricoh Company, Ltd., Tokyo, Japan

[21] Appl. No.: 240,475

[22] Filed: Sep. 6, 1988

Related U.S. Application Data

[63] Continuation of Ser. No. 46,179, Apr. 30, 1987, abandoned.

[30] Foreign Application Priority Data

Apr. 30, 1986 [JP] Japan ............................ 61-99582
Sep. 5, 1986 [JP] Japan ............................ 61-208028

[51] Int. Cl.⁴ .......................................... H04N 1/46
[52] U.S. Cl. ................................. 379/100; 364/137; 455/7
[58] Field of Search ............ 455/33, 34, 11, 12, 455/14, 3, 6, 7; 370/92, 85, 86, 88, 97; 340/825.5, 825.05; 379/100; 364/137, 188, 900; 358/78

[56] References Cited

U.S. PATENT DOCUMENTS

| | | | |
|---|---|---|---|
| 4,413,341 | 11/1983 | Markhasin et al. | 370/92 |
| 4,484,353 | 11/1984 | Flottes et al. | 455/34 |
| 4,528,656 | 7/1985 | Morais | 455/34 |
| 4,554,667 | 11/1985 | Smith et al. | 455/34 |
| 4,562,572 | 12/1985 | Goldman et al. | 455/33 |
| 4,599,598 | 7/1986 | Komoda et al. | 455/14 |
| 4,659,876 | 8/1983 | Sullivan et al. | 379/100 |
| 4,720,873 | 1/1988 | Goodman et al. | 370/75 |

Primary Examiner—Reinhard J. Eisenzopf
Assistant Examiner—Curtis A. Kuntz
Attorney, Agent, or Firm—Oblon, Spivak, McClelland, Maier & Neustadt

[57] ABSTRACT

A communication terminal apparatus having a relay function for relaying transmission information from a source station to a destination station. The transmission information includes not only document information, but also relay information, such as the address of the destination station and the apparatus type of the destination station. Thus, the communication terminal apparatus, upon receipt of the transmission information, can automatically transmits the transmission information to the desired destination station. Preferably, the communication terminal apparatus includes a conversion function for converting the format of the transmission information to another format, thereby allowing to transmit the transmission information between the source and destination stations different in apparatus type via the present communication terminal apparatus.

3 Claims, 33 Drawing Sheets

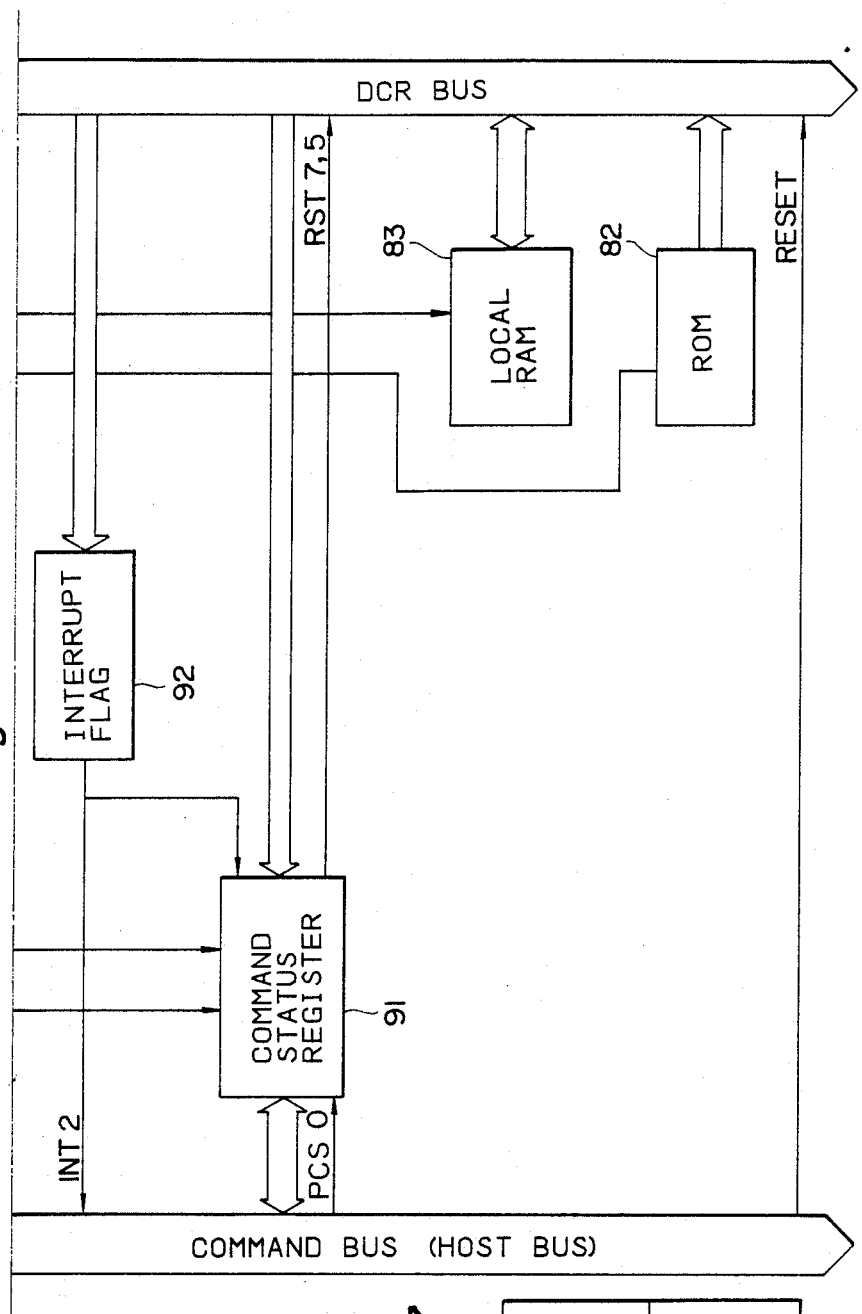
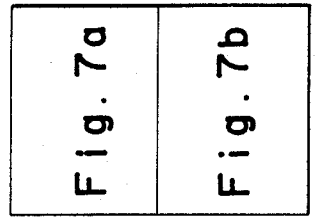

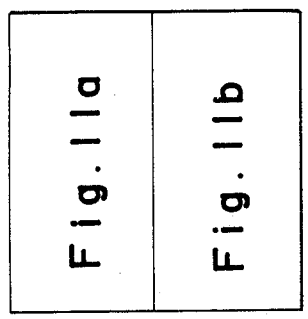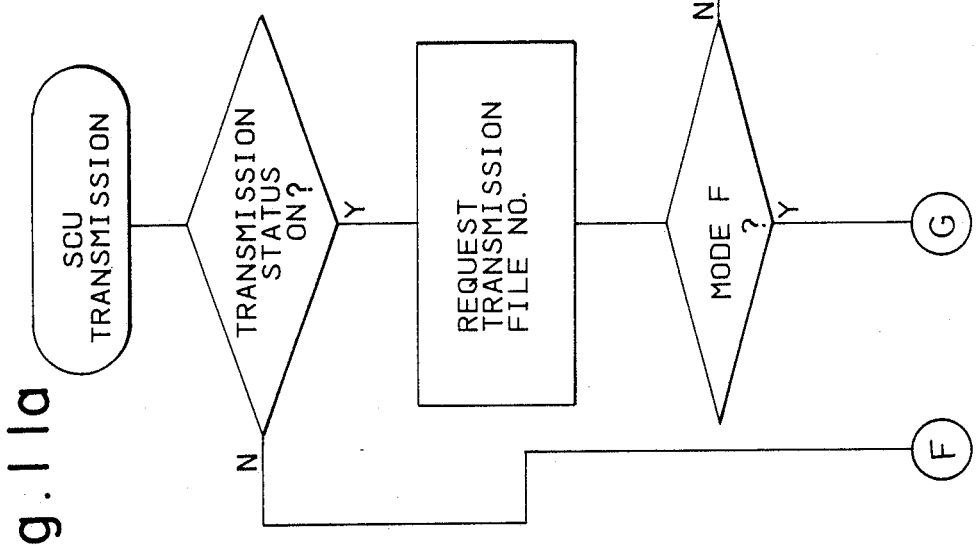

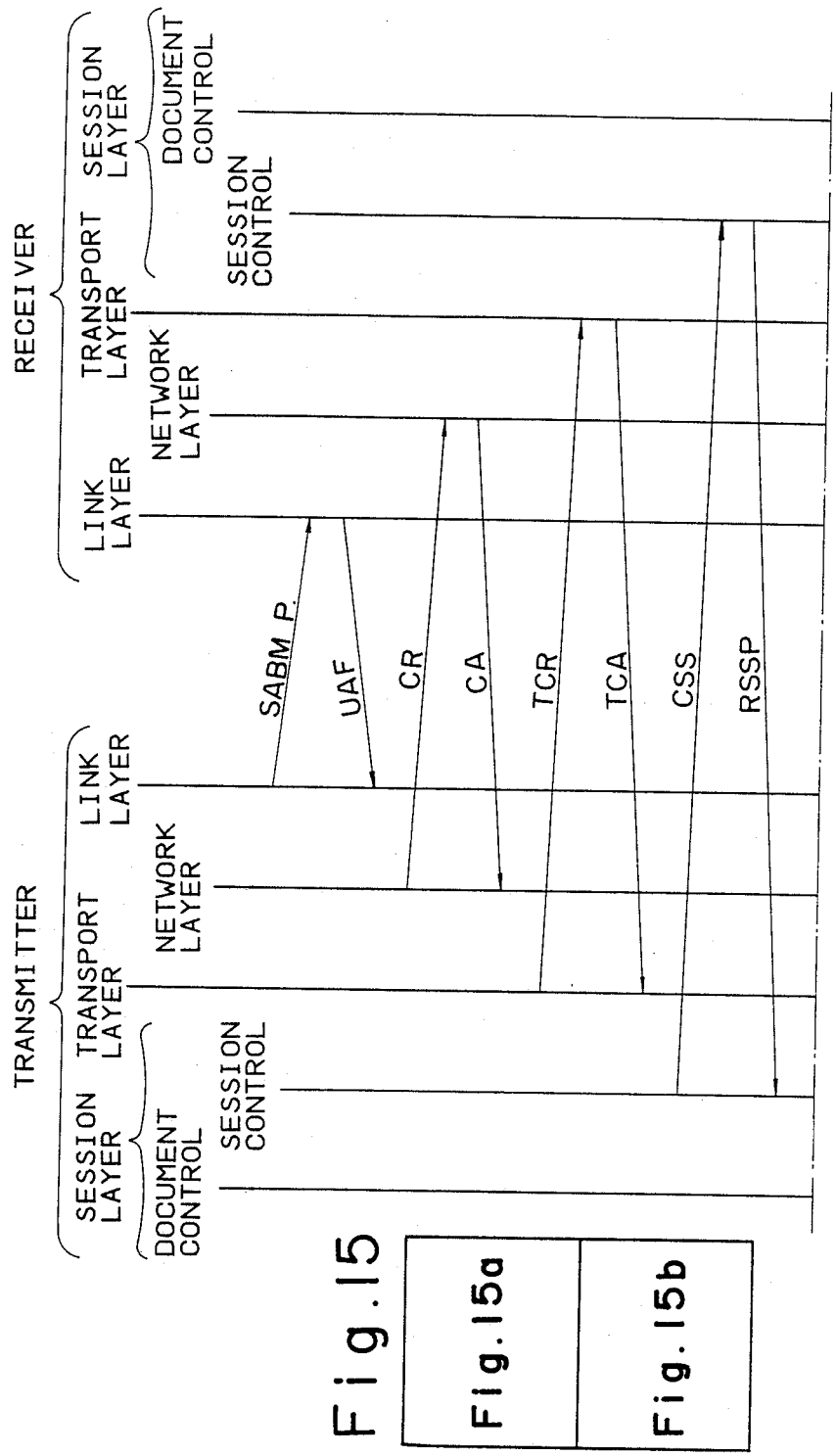

| Fig. 17a | Fig. 17b |

Fig.19
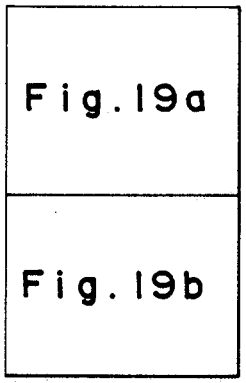
Fig.19a
Fig.19b
Fig.19a
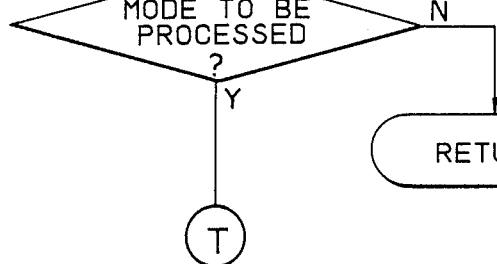
( FORMATION OF RELAY CONTROL LIST )
↓
STORE SOURCE AND DESTINATION ID AND ADDRESS
↓
SET "1" IN THE SOURCE TRANSMISSION POSSIBLE
↓
RETRIEVE A DESTINATION AT MINIMUM DISTANCE FROM THE SOURCE
↓
SET "0" IN THE RETRIEVED DESTINATION AND "1" IN THE TRANSMISSION POSSIBLE AND THE PROCESSING COMPLETED
↓
MODE TO BE PROCESSED ? — N → ( RETURN )
Y
↓
(S)  (T)

Fig. 20

| | A | B | C | D | E |
|---|---|---|---|---|---|
| A | | 278 | 236 | 248 | 274 |
| B | 278 | | 152 | 458 | 390 |
| C | 236 | 152 | | 330 | 240 |
| D | 248 | 458 | 330 | | 144 |
| E | 274 | 390 | 240 | 144 | |

Fig. 21

| ID | ADDRESS | SOURCE OF TRANSMISSION | TRANSMISSION POSSIBLE | PROCESSING COMPLETED | RELAY |
|----|---------|------------------------|----------------------|----------------------|-------|
|    |         |                        |                      |                      |       |
|    |         |                        |                      |                      |       |
|    |         |                        |                      |                      |       |
|    |         |                        |                      |                      |       |

Fig. 22

| ID | ADDRESS | SOURCE OF TRANSMISSION | TRANSMISSION POSSIBLE | PROCESSING COMPLETED | RELAY |
|---|---|---|---|---|---|
| 0 | A | — | — | — | — |
| 1 | B | 2 | O | — | O |
| 2 | C | 0 | — | — | — |
| 3 | D | 0 | — | — | — |
| 4 | E | 3 | O | — | O |

COMMUNICATION TERMINAL APPARATUS HAVING A RELAYING FUNCTION

This application is a continuation of application Ser. No. 046,179, filed on Apr. 30, 1987, now abandoned.

BACKGROUND OF THE INVENTION

1. Field of the Invention

This invention generally relates to a communication terminal apparatus, and, in particular, to a communication terminal apparatus having a relaying function suitable for use as a document processing communication terminal apparatus.

2. Description of the Prior Art

In general, communication terminal apparatuses for use in data communication include document forming or processing communication terminal apparatuses, such as communication word processors and teletexes, terminal apparatuses, such as personal computers or the like provided with a communication function, and facsimile machines. In the case of transmitting and receiving information through the public telephone network using such communication terminal apparatuses, if the distance between the transmitting and receiving communication terminals is long, the fee for using the network becomes high. In particular, in the case of transmitting information to a large number of destinations, the transmitting time becomes excessive so that the fee for using the network becomes also excessive, and, thus, the communication efficiency becomes lowered.

Among the communication terminal apparatuses, there are those which are provided with a broadcasting function, thereby allowing to transmit the same information to a plurality of destinations at the same time. When broadcasting is designated, if such a communication terminal apparatus having a broadcasting function has a plurality of transmission lines, the same information is transmitted to a plurality of destinations at the same time; whereas, if there is only one transmission line, the same information is transmitted to a plurality of destinations one after another in sequence. However, such a prior art broadcasting technique is not high in communication efficiency. In particular, when the communication terminal apparatuses are located far apart from one another, the fee for using the network connecting these communication terminal apparatuses becomes high. And, particularly, if the same information is to be transmitted to a plurality of destinations under the circumstances, it takes much more time so that the fee for using the network becomes excessive.

SUMMARY OF THE INVENTION

In accordance with the first aspect of the present invention, there is provided a communication terminal apparatus having a relaying function for relaying information received from a source terminal apparatus to a destination terminal apparatus. In the preferred embodiment, such a communication terminal apparatus also includes means for adapting the information to be relayed so as to be receivable by the destination terminal apparatus.

In accordance with the second aspect of the present invention, there is provided a communication terminal apparatus having a broadcasting function for transmitting the same information to a plurality of destination terminal apparatuses and storing information regarding relay terminal apparatuses in the network. Thus, when the communication terminal apparatus is given an instruction to carry out a broadcasting operation, the information is transmitted to selected one or more of relay terminal apparatuses so that the information is transmitted to a plurality of destination terminal apparatuses via selected one or more of the relay terminal apparatuses. In this manner, when a broadcasting operation is to be carried out to transmit the same information to a plurality of destination terminal apparatuses, one or more of relay terminal apparatuses in the network is selected, and, then, the information is transmitted to the destination terminal apparatuses via the thus selected relay terminal apparatuses. For example, if the communication terminal apparatus is going to transmit the same information to a plurality of destination terminal apparatuses which are located far away from the source communication terminal apparatus but which are located rather close to a relay terminal apparatus in the network, then the source communication terminal apparatus first transmits the information to this relay terminal apparatus which in turn relays the thus received information to the plurality of destination terminal apparatuses.

BRIEF DESCRIPTION OF THE DRAWINGS

FIG. 7 is a schematic illustration showing how to combine FIGS. 7a and 7b;

FIGS. 7a and 7b, when combined as illustrated in FIG. 7, define a block diagram showing the overall structure of a data compression unit (DCR) shown in FIG. 3;

FIG. 11 is a schematic illustration showing how to combine FIGS. 11a and 11b;

FIGS. 11a and 11b, when combined as illustrated in FIG. 11, define a flow chart showing one example of transmission processing;

FIG. 15 is a schematic illustration showing how to combine FIGS. 15a and 15b;

FIGS. 15a and 15b, when combined as illustrated in FIG. 15, define an illustration showing one example of communication protocol sequence;

FIG. 19 is a schematic illustration showing how to combine FIGS. 19a and 19b;

FIGS. 19a and 19b, when combined as illustrated in FIG. 19, define a flow chart showing relay control list forming processing to be implemented by the structure shown in FIGS. 17a and 17b;

FIGS. 20 through 22 are schematic illustrations which are useful for understanding the sequence of steps in the flow chart of FIGS. 19a and 19b;

DESCRIPTION OF THE PREFERRED EMBODIMENTS

Figure 2:
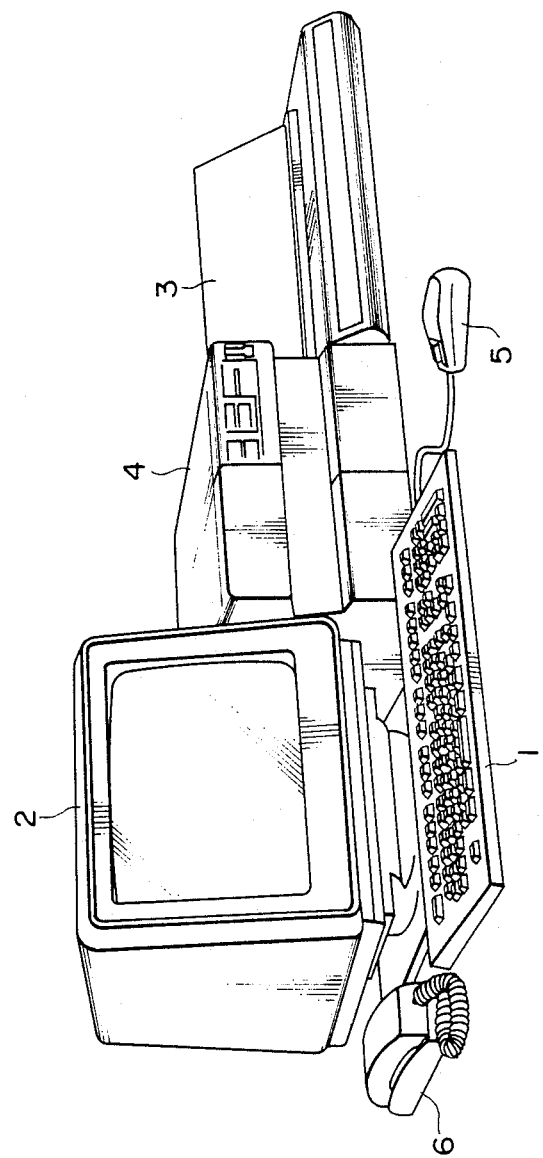
FIG. 2 is a schematic illustration showing the overall outlook of a document processing (forming) communication terminal apparatus constructed in accordance with one embodiment of the present invention.

Referring first to FIG. 2, there is shown schematically a document processing (forming) communication terminal apparatus constructed in accordance with one embodiment of the present invention. As shown, the document processing communication terminal apparatus includes a keyboard 1 provided with a plurality of keys for inputting character information, such as katakana (Japanese), hiragana (Japanese), kanji (Chinese characters), English alphabets and numerals, and control information necessary for document formation, document transmission and system control. The apparatus also includes a display device 2 for displaying document (text) information and those information which is necessary for various operations, such as document formation (composition) and editing operation and document transmission operation. Also provided in the apparatus is a wire-dot serial printer 3 for recording such information as formed document information, received document information and transmitting and receiving records on a sheet of recording paper. The apparatus further includes a main module 4, which houses therein various units, such as a floppy disk drive, a thin hard disk drive, a system control unit and a communication control unit, a mouse (cursor mover) 5 and a telephone receiver 6.

It is to be noted that the specification regarding teletex and facsimile communications by this document forming communication terminal apparatus is based on CCITT recommendations on teletex and facsimile communications and also on a recommended communication system of a Japanese teletex machine prepared by the Japanese Ministry of Posts and Telecommunications, though the present invention should not be limited only to this.

Figure 3:
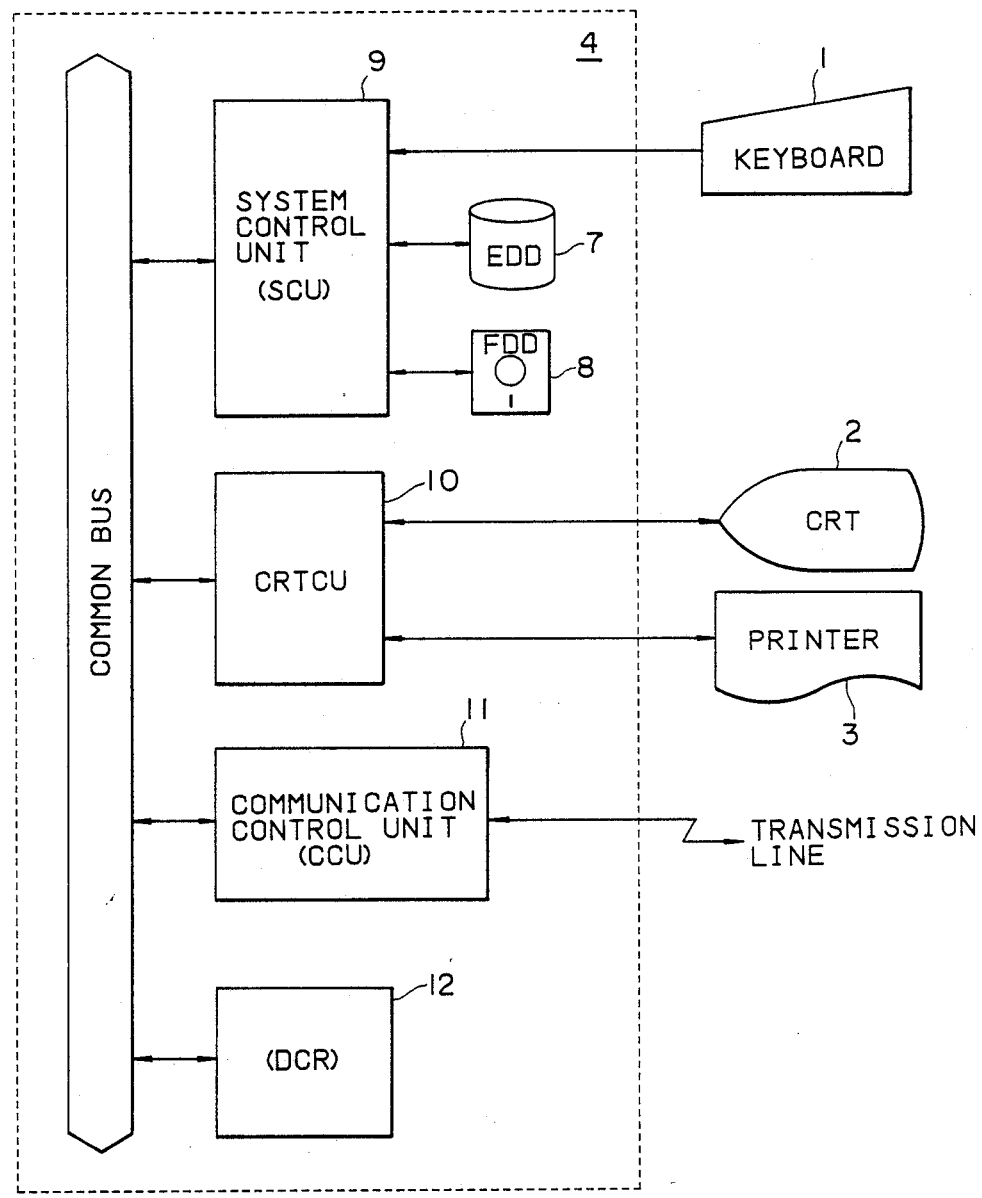
FIG. 3 is a block diagram showing one example of the internal control system of the apparatus shown in FIG. 2.

FIG. 3 is a block diagram showing the overall structure of an internal control system provided in the main module 4. As shown, the internal control system includes a hard disk drive (HDD) 7, which, for example, has a capacity of 20 megabytes and which stores an operating system (OS) having a resident process function capable of carrying out multi-task control, a kana-kanji conversion program, a kana-kanji conversion dictionary, created document information, a document transmission and reception program, and the like. Also provided is a floppy disk drive (FDD) 8 which, for example, may include a well-known 5 inch double density floppy disk drive and which stores document information and the like.

A system control unit (SCU) 9 is in charge of the overall control of this communication terminal apparatus, and it handles such operations as word processing operation, such as creation and editing of a document, data compression processing of a transmission document, a procedure relating to a document transmission and reception in relation to a communication control unit 11, local transmission and reception processing, such as printing of a received document, and relay transmission control processing. A CRT control unit (CRTCU) 10 is in charge of display control of the display device 2 and print control of the printer 3. The communication control unit (CCU) 11 takes care of a communication control, such as a document transmission control for transmitting a document to a receiving terminal apparatus, such as a teletex terminal apparatus, a facsimile machine (FAX), or a document processing communication terminal apparatus of the same kind, and a document reception control for receiving a document from a transmitting terminal apparatus. A data compression unit (DCR) 12 provides a function of converting an image data into a compression code in accordance with the protocol of facsimile communication. Although not shown specifically, it is to be noted that the main module 4 further contains therein a mouse interface for the mouse 5 and a scanner interface for an image scanner (not shown).

Figure 4:
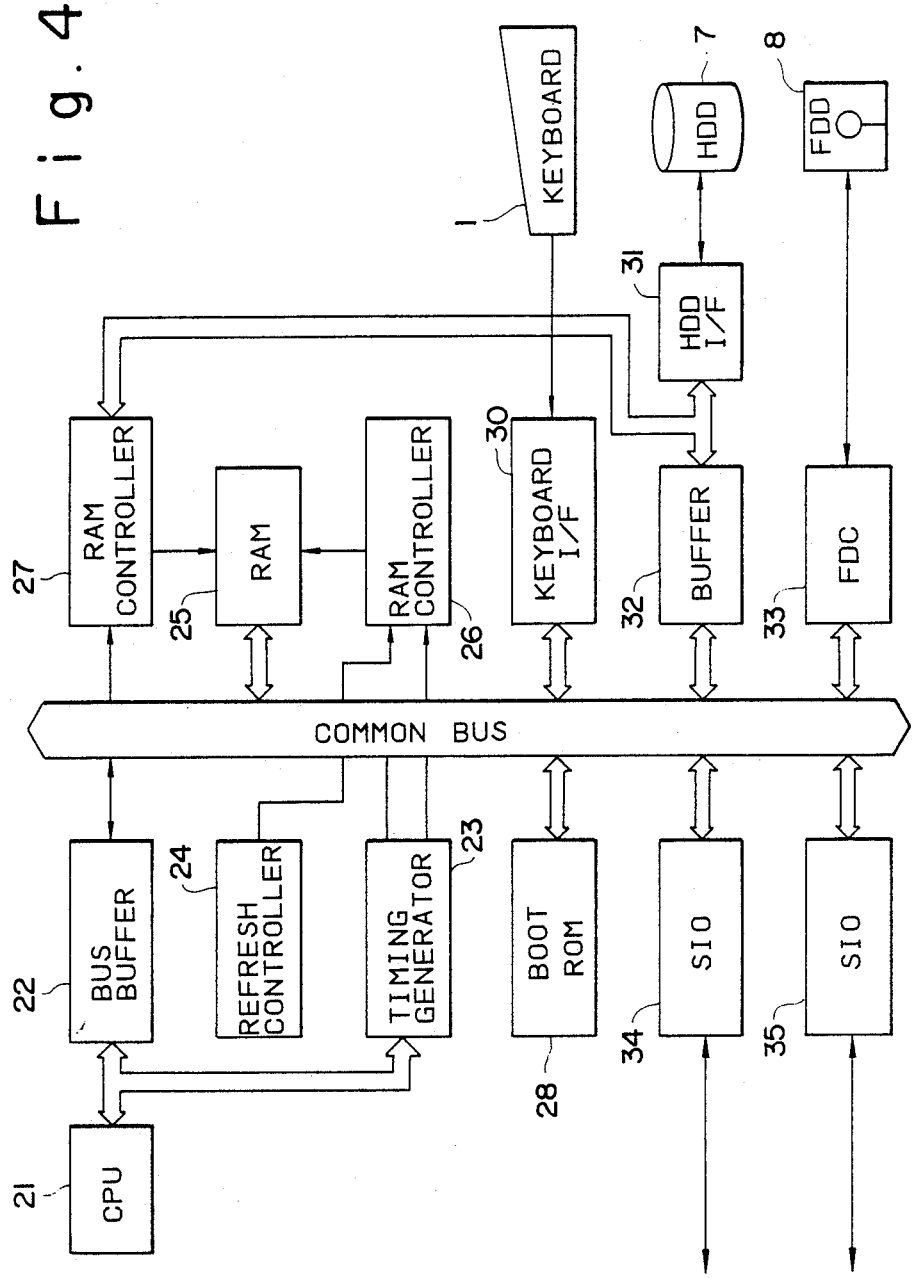
FIG. 4 is a block diagram showing the overall structure of a system control unit (SCU) shown in FIG. 3.

FIG. 4 shows in block form the overall structure of the system control unit 9 provided in the control system shown in FIG. 3. This system control unit 9 includes a central processing unit or simply CPU 21 comprised of a 16-bit microprocessor or the like and in charge of the control of the overall system. A bus buffer 22 is interposed between the CPU 21 and a common bus. In addition, a timing generator 23 and a refresh controller 24 are also provided as connected to the common bus. The system control unit 9 also includes a random access memory or simply RAM 25 having the capacity of, for example, 512 KB and including a system region for storing resident programs, such as an OS and a program relating to reception of a document, and other regions, RAM controllers 26 and 27 for controlling the RAM 25, and boot ROM 28 which stores a boot program for controlling the loading of a program into the RAM 25. The system control unit 9 further includes a keyboard interface (I/F) 30 for handling information transfer with the keyboard 1, a hard disk interface (HDD I/F) 31 for controlling the HDD 7, a buffer 32 interposed between the HDD I/F 31 and the common bus, and floppy disk controller (FDC) 33 for controlling the FDD 8. In addition, the system control unit 9 is also provided with serial ports (SIO) 34 and 35.

Figure 5:
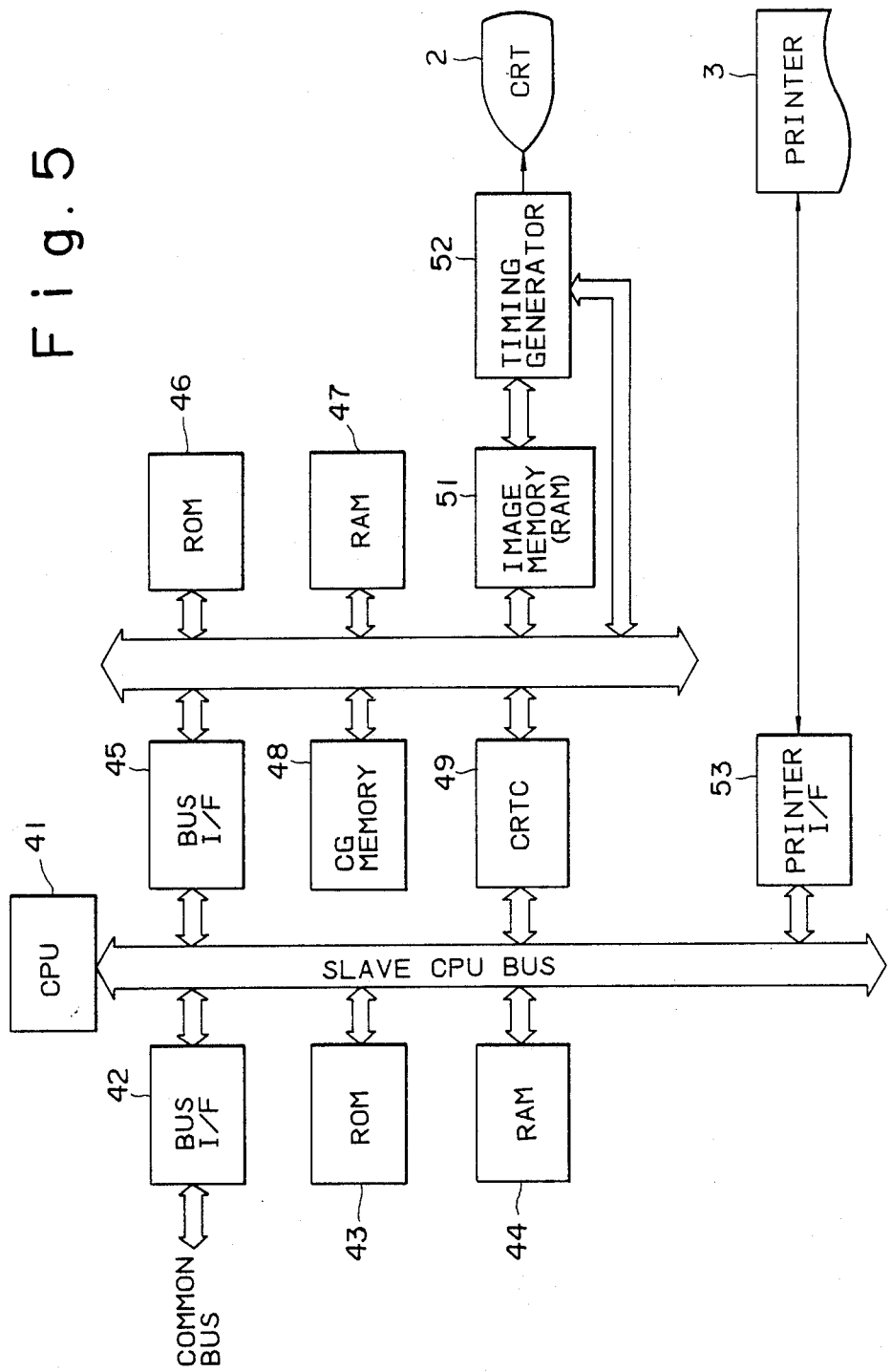
FIG. 5 is a block diagram showing the overall structure of a CRT control unit (CRTCU) shown in FIG. 3.

FIG. 5 shows in block form one example of the CRT control unit (CRTCU) 10. As shown, the CRTCU 10 includes a slave CPU 41 comprised, for example, of a 16-bit microprocessor and in charge of the overall control, a bus interface 42 interposed between a slave CPU bus and the common bus, a ROM 43 having the capacity of, for example, 16 KB for use in IPL, and a RAM 44 having a common memory portion shared by the system control unit 9 and a program memory portion for storing a predetermined program. The common memory defined by this RAM 44 includes an index buffer, a management region, a record region, a data buffer for FAX transmission, a page buffer for a printer, and a data buffer for image editing. The CRTCU 10 includes a bus interface 45 interposed between the slave CPU bus and the micro bus, a ROM 46 for micrprogramming, and a RAM 47 as a program control memory. In addition, the CRTCU 10 includes a character graphic (CG) memory 48 comprised of a kanji pattern ROM, a layout data ROM, a system ROM, and a non-standard letter pattern RAM, and a CRT controller 49. Furthermore, the CRTCU 10 includes an image memory 51 for developing the display data to be supplied to the display device (CRT) 2, a timing generating circuit 52 for controlling the timing of display, and a printer interface 53 for handling data transfer with the printer 3.

Figure 6:
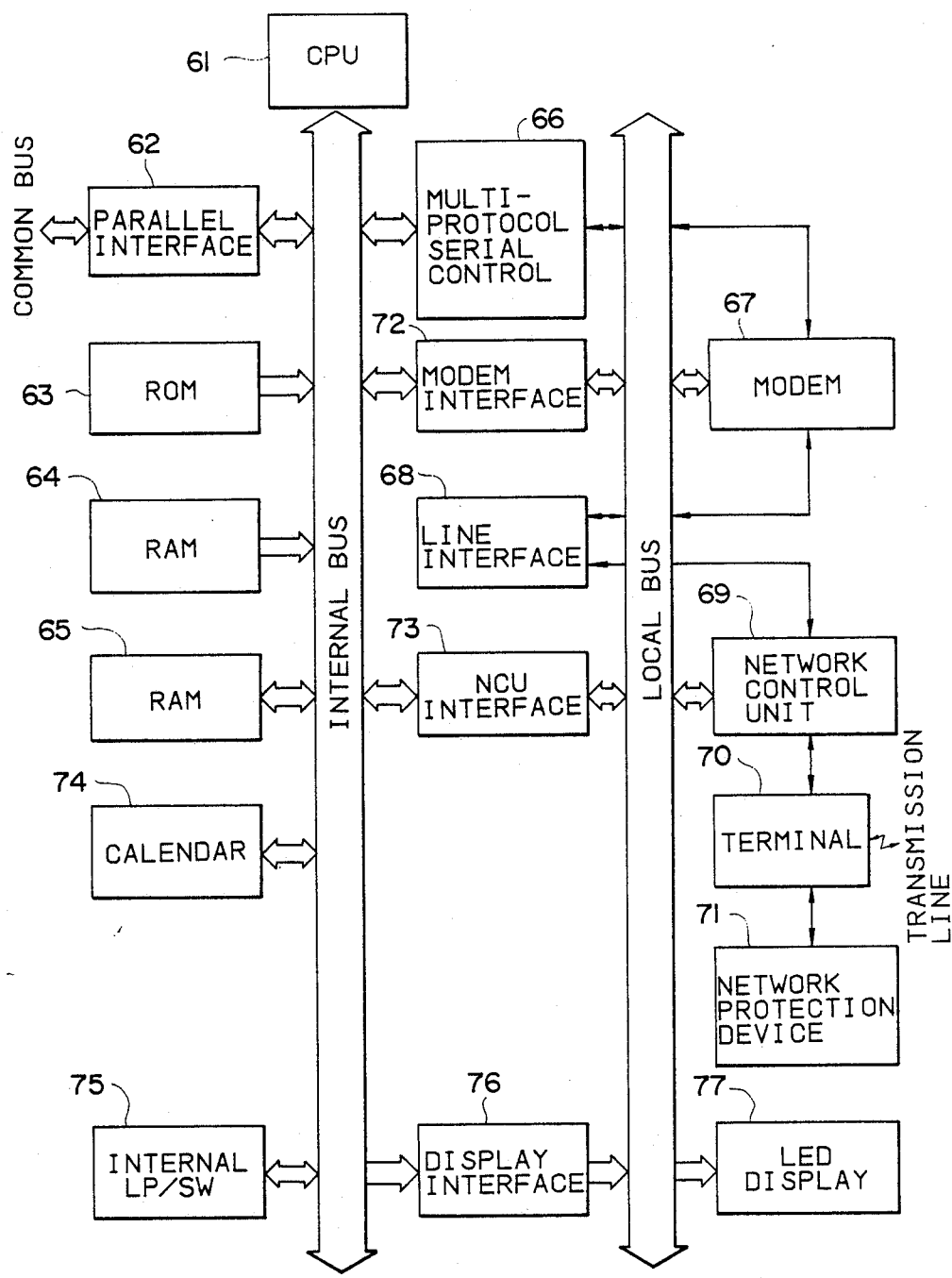
FIG. 6 is a block diagram showing the overall structure of a communication control unit (CCU) shown in FIG. 3.

FIG. 6 shows in block form an example of the communication control unit (CCU) 11 provided in the control system shown in FIG. 3. As shown, the communication control unit 11 includes a CPU 61 comprised, for example, of a 16-bit microprocessor and in charge of the overall control, a parallel interface 62 for interfacing with the common bus, a ROM 63 for storing teletex communication control and facsimile communication control programs, a RAM 64 mainly for use as a working memory, and a RAM 65 for use as a communication memory for storing received document information and transmitting document information so as to carry out communication between memories. In addition, the communication control unit 11 includes a multi-protocol serial control (MPSC) 66, a MODEM 67, a line interface 68, a network control unit (AA-NCU) 69, a terminal 70, a network protection device (PD), a MODEM interface 72 for the MODEM 67 and the network control unit 69, and an NCU interface 73 so as to carry out communication with another communication terminal apparatus through the public telephone network. The communication control unit 11 further includes a calendar 74 for use in management of the date and time of transmission and reception, a switch (LP/SW) for setting the internal condition, a display interface 76 for displaying the presence or absence of a received document, and a light-emitting diode or simply LED 77. It is to be noted that, although not shown specifically, the communication control unit 11 also includes a X.21 interface and a connector so as to allow to use a packet switching network or a circuit switching network as well as the public telephone network.

Figure 7A:
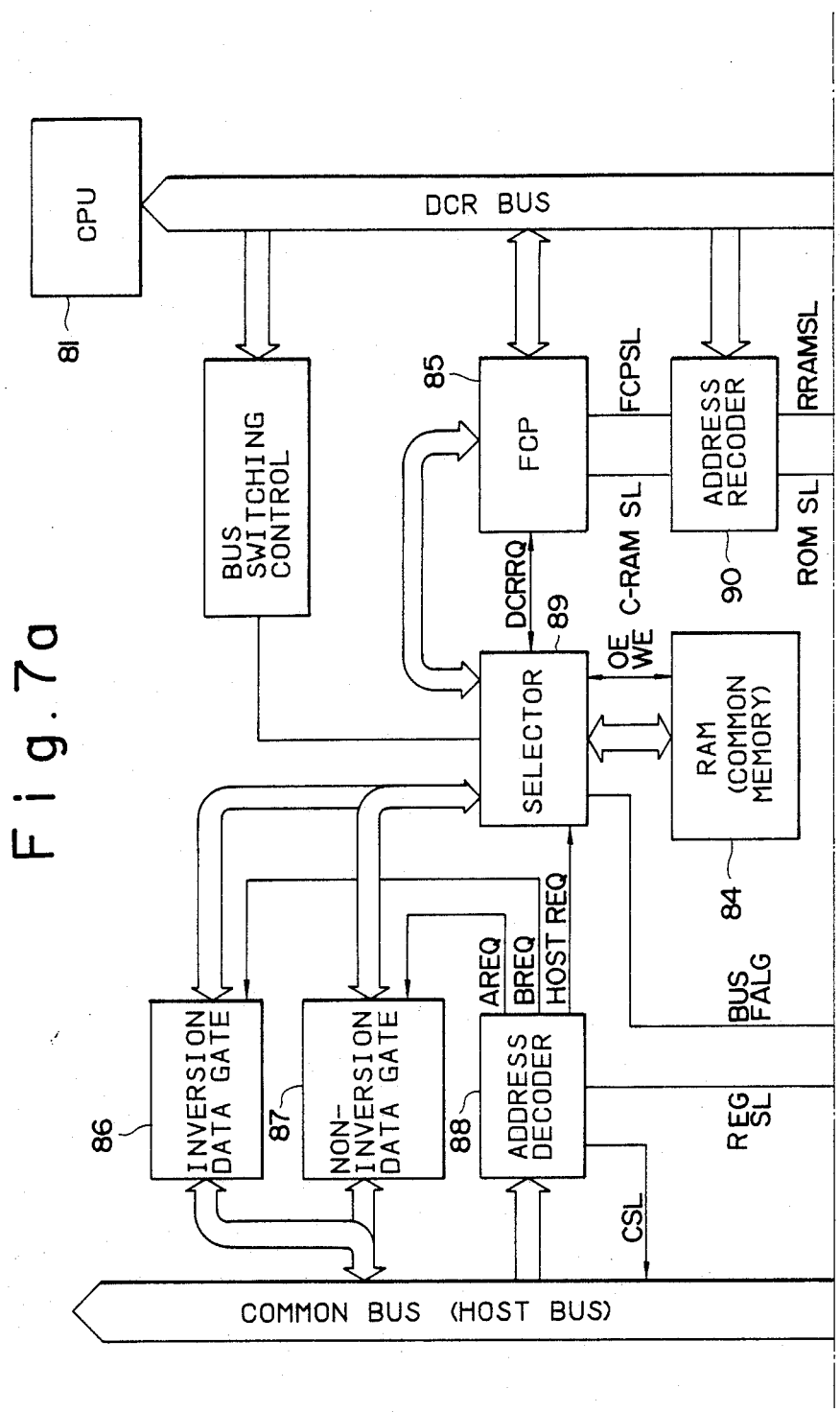

FIGS. 7a and 7b, when combined as illustrated in FIG. 7, show in block form the detailed structure of one example of the data compression unit (DCR) 12. As shown, the DCR 12 controls the overall operation by a microcomputer system comprised of a CPU 81, a ROM 82 and a local RAM 83. Provided is a common memory 84 which is shared by the DCR 12 and the system control unit 9 (host) and which is comprised of a command response area for storing a command response, an image data area for storing an image data (image information data) to be compressed, and a compression code area for storing a compressed image data (image information). Also provided is a facsimile control processor (FCP) 85 which serves to compress the image data stored in the image data area of the common memory 84 and to store the compression code (image information) after compression into the compression code area of the common memory 84. Also provided is an inversion data gate 86 which inverts the bit arrangement of the data to be written into the common memory 84 or the data read out of the common memory 84 and has the data passed therethrough. There is also provided a non-inversion data gate 87 which causes the data to be written into the common memory 84 or the data read out of the common memory 84 to be passed therethrough with the bit arrangement unchanged.

The DCR shown in FIGS. 7a and 7b includes an address decoder 88 which decodes an address data from the common bus and outputs such signals as a gate request AREQ for selecting the inversion data gate 86, a gate request BREQ for selecting the non-inversion data gate 87, a host request HOSTREQ for requesting the use of the common memory 84 by the host side, a register selector REGSL, and a card select CSL. Also provided is a selector 89 which, in response to the DCR request DCRRQ requesting to use the common memory 84 supplied from the FCP 85 and the host request HOST from the address decoder 88, switches the data input/output line of the common memory 84 to the FCP 85, inversion data gate 86, or non-inversion data gate 87 selectively and which outputs an output enable OE and a write enable WE to the common memory 84 and also a bus flag BUSFLAG. Also provided is an address decoder 90 which outputs a common memory select C-RAMSL and a FCP select FCPSL to the FCP 85 in response to an address data from the CPU 81 and which also outputs a ROM select ROMSL to the ROM 82 and also a local RAM select RRAMSL to the local RAM 81. It is to be noted that the DCR 12 is also provided with a command status register 91 and an interrupt flag 92.

Figure 1A:
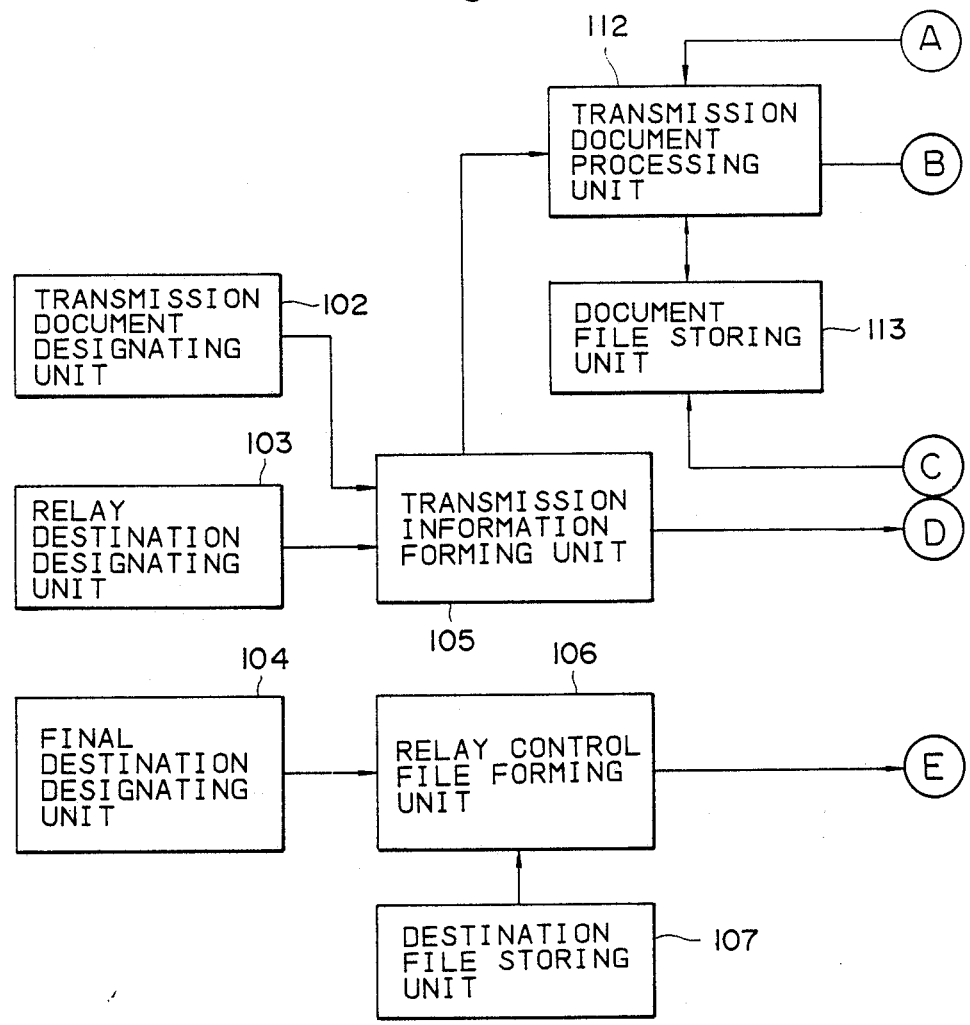
FIGS. 1a and 1b, when combined as illustrated in FIG. 1, show a communication terminal apparatus having a relaying function constructed in accordance with one embodiment of the present invention.
Figure 1:
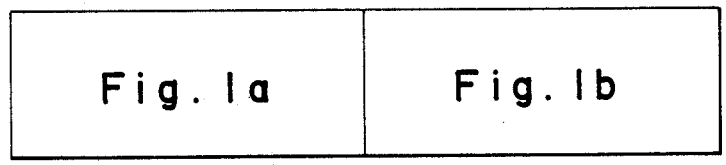
FIG. 1 is a schematic illustration showing how to combine FIGS. 1a and 1b.
Figure 1B:
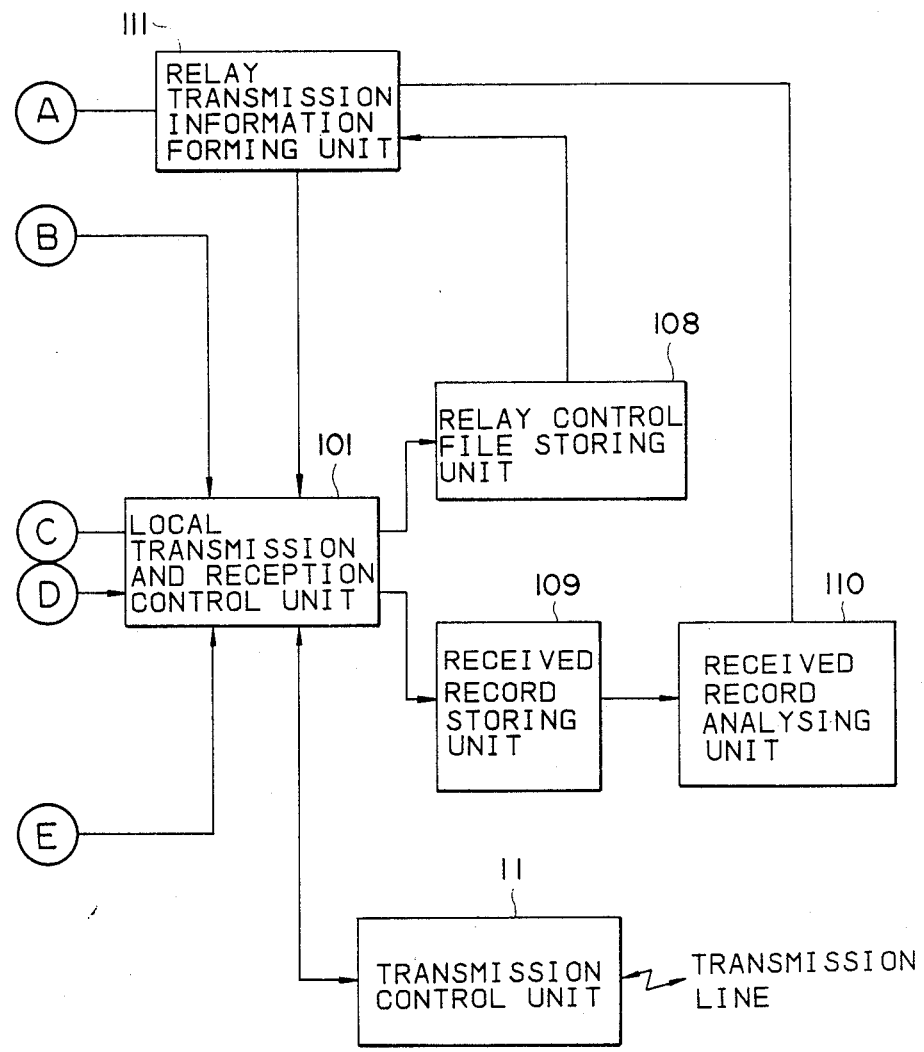

FIGS. 1a and 1b, when combined as illustrated as shown in FIG. 1, illustrate in functional block form that portion of the present communication terminal apparatus which relates to a relay and broadcast control operation. As shown, the relay and broadcast control system of the present communication terminal apparatus includes a local transmission and reception control unit 101 which serves to transmit information transmitted from each unit of the system side to the communication control unit 11 and also to receive information transmitted from the communication control unit 11. The relay and broadcast control system further includes a transmission document designating unit 102 which designates the document name of a document to be transmitted, a relay destination designating unit 103 which designates the address of a relay communication terminal apparatus, and a final destination designating unit 104 which designates the address of a final destination communication terminal apparatus to which the document is to be finally transmitted via the relay communication terminal apparatus.

Also provided is a transmission information forming unit 105 which receives the title of a document to be transmitted from the transmission document designating unit 102 and also the relay address from the relay address designating unit 103, thereby forming transmission information which, in turn, is transmitted to the communication control unit 11 via the local transmission and reception control unit 101. Also provided in the relay and broadcast control system is a relay control file forming unit 106 which receives a final destination (address) from the final destination designating unit 104 and examines the destination (address) file registering the type of terminal apparatus for each destination (address) stored in the destination file storing unit 107 to read out the information regarding the type of the terminal apparatus of the final destination, whereby a relay control file comprised of the final destination received and the information regarding the type of the terminal apparatus read out is formed and this relay control file is transmitted to the communication control unit 11 via the local transmission and control unit 101.

A relay control file storing unit 108 stores a relay control file which has been supplied from the communication control unit 11 via the local transmission and reception control unit 101, i.e., which has been transmitted from a source communication terminal apparatus; on the other hand, a received record storing unit 109 stores a received record which has been supplied from the communication control unit 11 via the local transmission and reception control unit 101. A received record analyzing unit 110 reads out the received record stored in the received record storing unit 109 to determine the presence or absence of relay transmission designation information, and, if such information has been found to be present, then the unit 110 apprise of this fact to a relay transmission information forming unit 111. Upon having been apprised of the presence of relay broadcast designation from the received record analyzing unit 110, the relay transmission information forming unit 111 reads out the received relay control file stored in the relay control file storing unit 108 to form relay transmission information comprised of a final destination address and the information regarding the type of the terminal apparatus of the final destination, and this relay transmission information is supplied to the communication control unit 11 via the local transmission and reception control unit 101.

A transmission document processing unit 112 reads out a transmission document corresponding to a transmission document name supplied from the transmission information forming unit 105 from the document file storing unit 113 and then converts the transmission doucment into transmission document information suitable for the type of the terminal apparatus of the final destination to which the transmission document is to be transmitted, thereby supplying this transmission document information to the communication control unit 11 via the local transmission and reception control unit 101. In addition, the transmission document processing unit 112 reads out a relay transmission document, which has been received so as to be relayed to a final destination terminal apparatus, from the document file storing unit 113 corresponding to a relay transmission document name supplied from the relay transmission information forming unit 111, and, then, converts this relay transmission document information in document information suitable for the type of a destination terminal apparatus to which the document information is to be transmitted according to the data stored in the relay transmission information forming unit 111, whereby this relay transmission document information is supplied to the communication control unit 11 via the local transmission and reception control unit 101.

Now, the operation of the structure shown in FIGS. 1a and 1b will be described in detail below.

In the first place, the transmission mode of the present document processing (forming) communication terminal apparatus includes (1) a teletex mode for transmission to a teletex terminal apparatus and (2) a facsimile mode (also referred to as "mode F") for transmission to a facsimile terminal apparatus. The teletex mode is further divided into two modes, one of which is a teletex mode for transmission to a terminal apparatus having a standard teletex communication function based on the CCITT recommendations or the like (referred to as "mode T") and the other of which is a private mode for transmission to a communication terminal apparatus having a private communication function as well as a standard teletex communication function similar to the transmitting terminal apparatus (referred to as "mode P"). In the present document processing communication terminal apparatus, there is previously registered a destination (address) list containing the name of a destination communication terminal apparatus, the address (such as a telephone number), and the type of the destination communication terminal apparatus, i.e., which of the above-described transmission modes (mode F/T/P) is possessed by the destination communication terminal apparatus, thereby identifying the destination communication terminal apparatus to be serving as a facsimile terminal apparatus, a teletex terminal apparatus, or a private teletex terminal apparatus.

Figure 8:
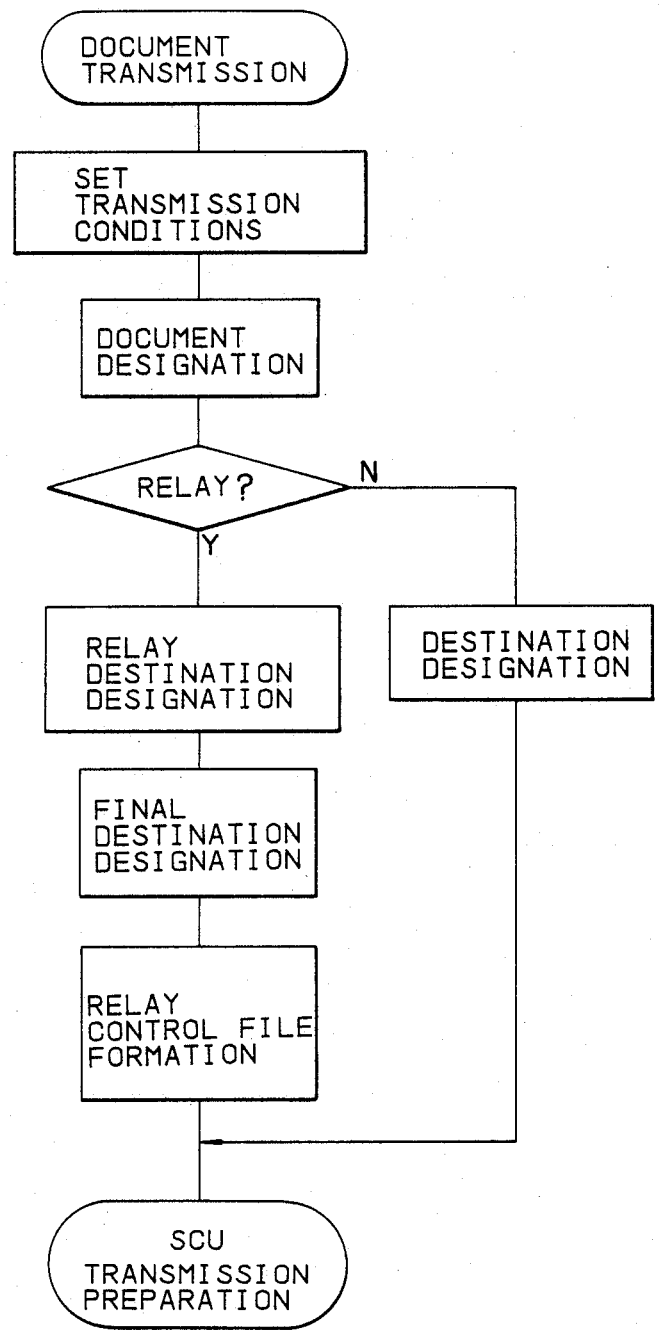
FIGS. 8 through 10 are flow charts showing one example of the document transmission processing and document transmission preparation processing implemented by the system control unit and the communication control unit.

Now, the document transmission processing operation implemented by the system control unit 9 of the present document processing communication terminal apparatus will be described in detail also with reference to FIG. 8. When document transmission among a teletex communication menu in a task selection step [not shown] has been selected, a menu for setting the transmission condition for document transmission is displayed on the screen, whereby the transmission condition setting processing is carried out for transmission mode (ordinary transmission, urgent transmission, relay transmission, etc.), time of transmission, and contents of transmission (e.g., Japanese) by key operation. Upon completion of this transmission condition setting processing, the document names registered in the document file is read out and a menu of document name list is displayed on the screen, whereby a particular document name for transmission is designated by key operation to implement a document designation step. After this document designation step, it is checked whether or not relay transmission is designated at a transmission condition setting step.

If relay transmission is designated, the address list registered in the destination or address file is read out and a menu for designation of relay destination is displayed. Then, the name of relay destination, i.e., the name of a destination communication terminal apparatus to which information is to be relayed, is designated by key operation at a relay destination designation step. Then, while keeping the address list displayed, a menu for designation of a final destination is displayed and a final destination, to which the relayed information is to be transmitted, is selected by key operation to carry out a final destination designation step. Thereafter, there is formed a relay control file comprised of the address information of the final destination and the type (or mode) information of the communication terminal apparatus of the final destination.

On the other hand, if no relay transmission has been designated, a menu for destination designation is read out of the address (destination) list registered in the address file and displayed, and, then, a particular name of destination (in this case, a final destination) to which information is to be transmitted is designated by key operation to carry out a destination designation step.

Thereafter, although not shown, for example, the name of destination, the name of document, etc. are displayed for confirmation. And, if the steps thus far implemented are to be cancelled, it proceeds to a cancel step; on the other hand, if the steps thus far implemented have been confirmed, then it proceeds to a SCU transmission preparation processing operation.

Figure 9:
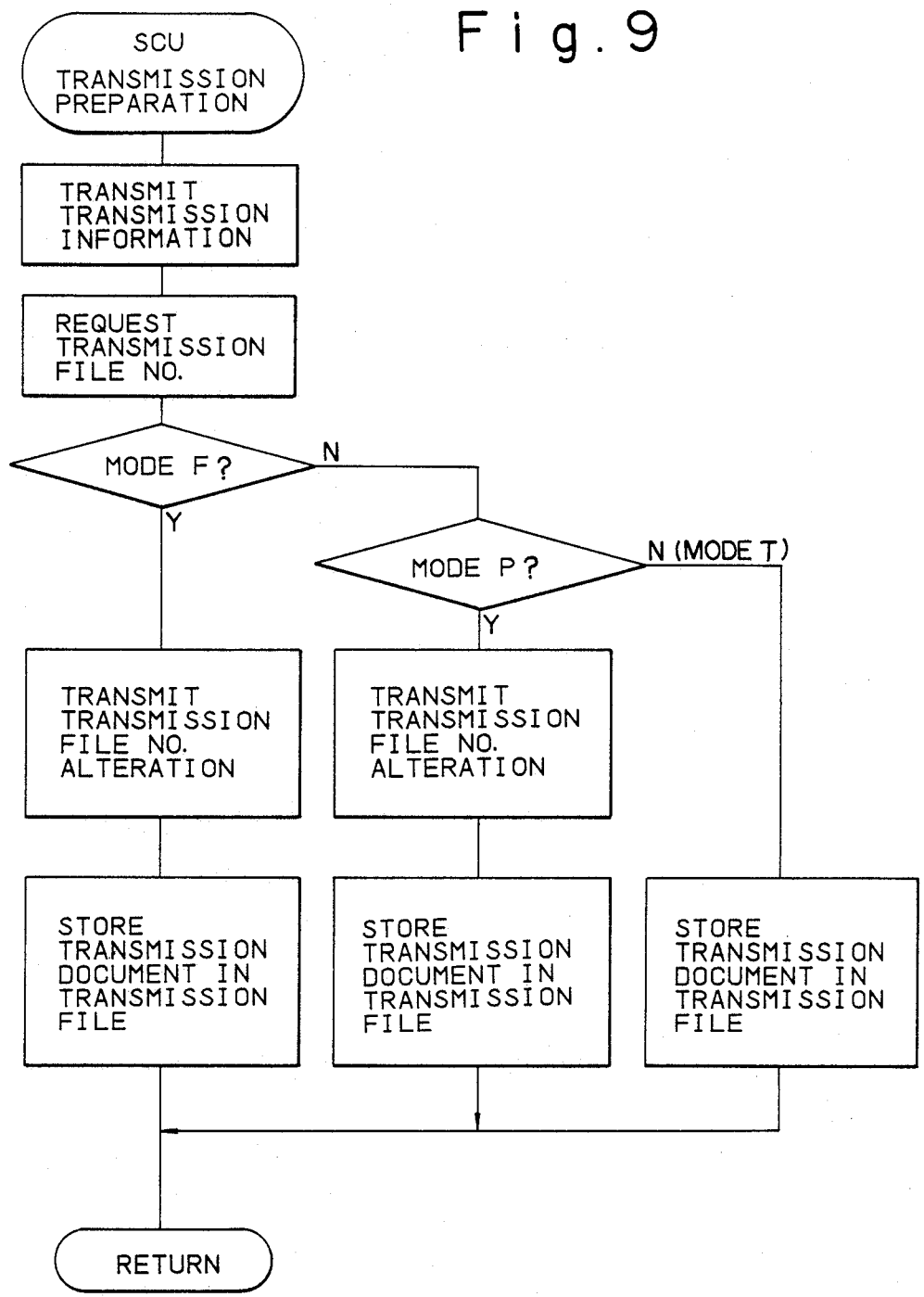
Figure 10:
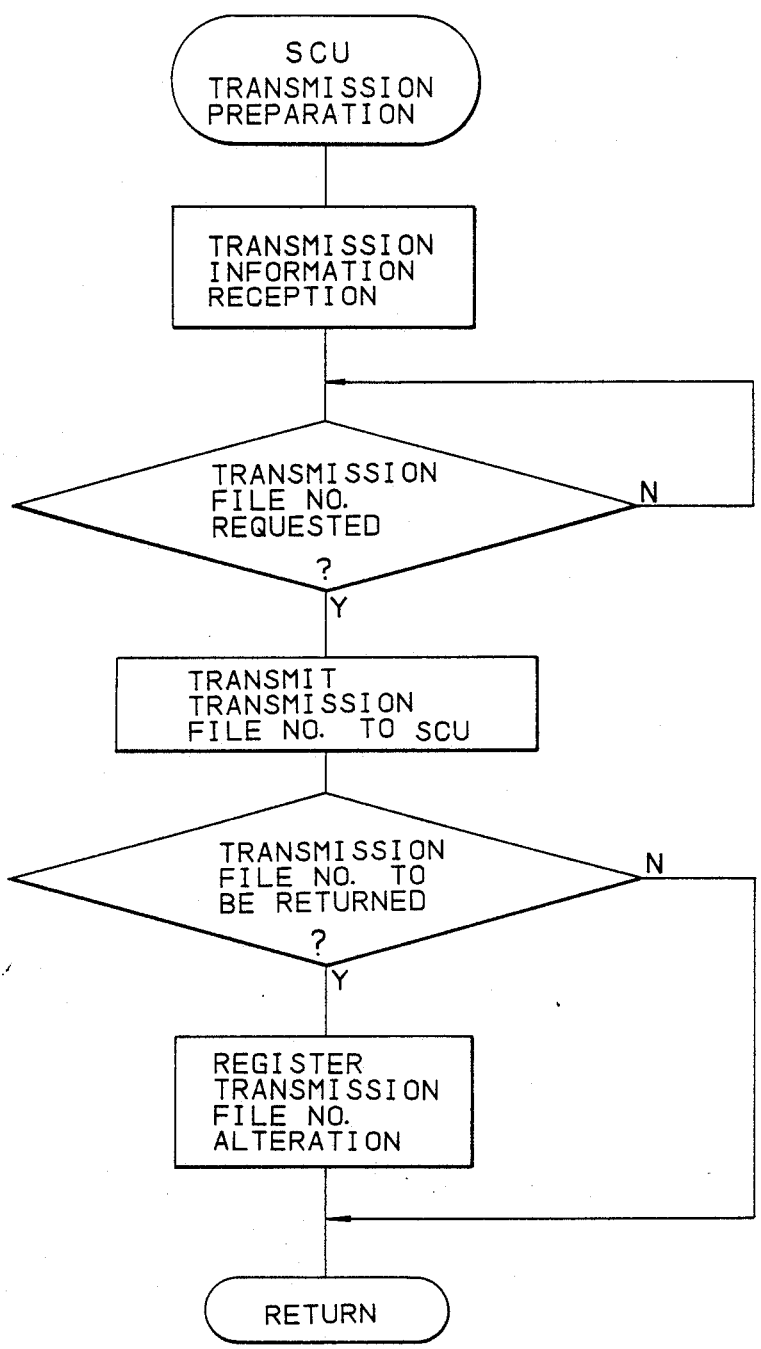
Figure 11B:
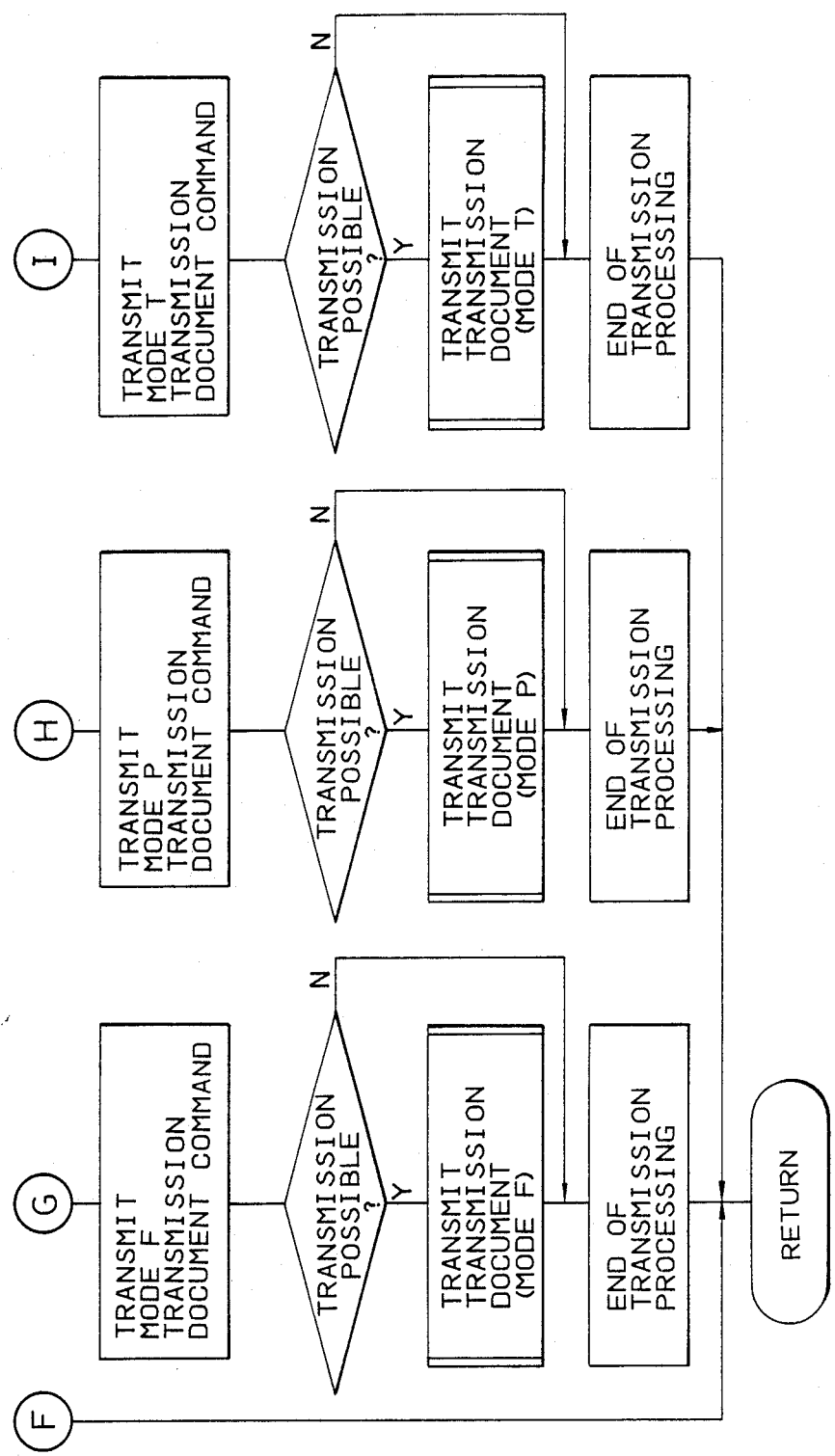
Figures 12, 12A, 12B:
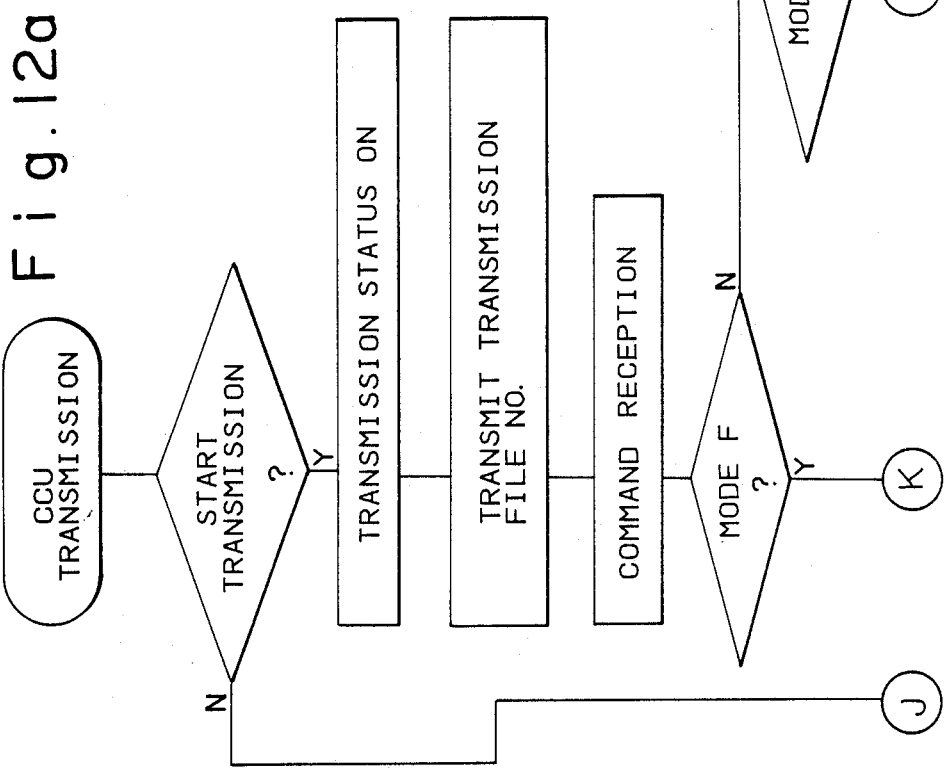
FIG. 12 is a schematic illustration showing how to combine FIGS. 12a and 12b.
FIGS. 12a and 12b, when combined as illustrated in FIG. 12, define a flow chart showing one example of transmission processing.
Figure 12B:
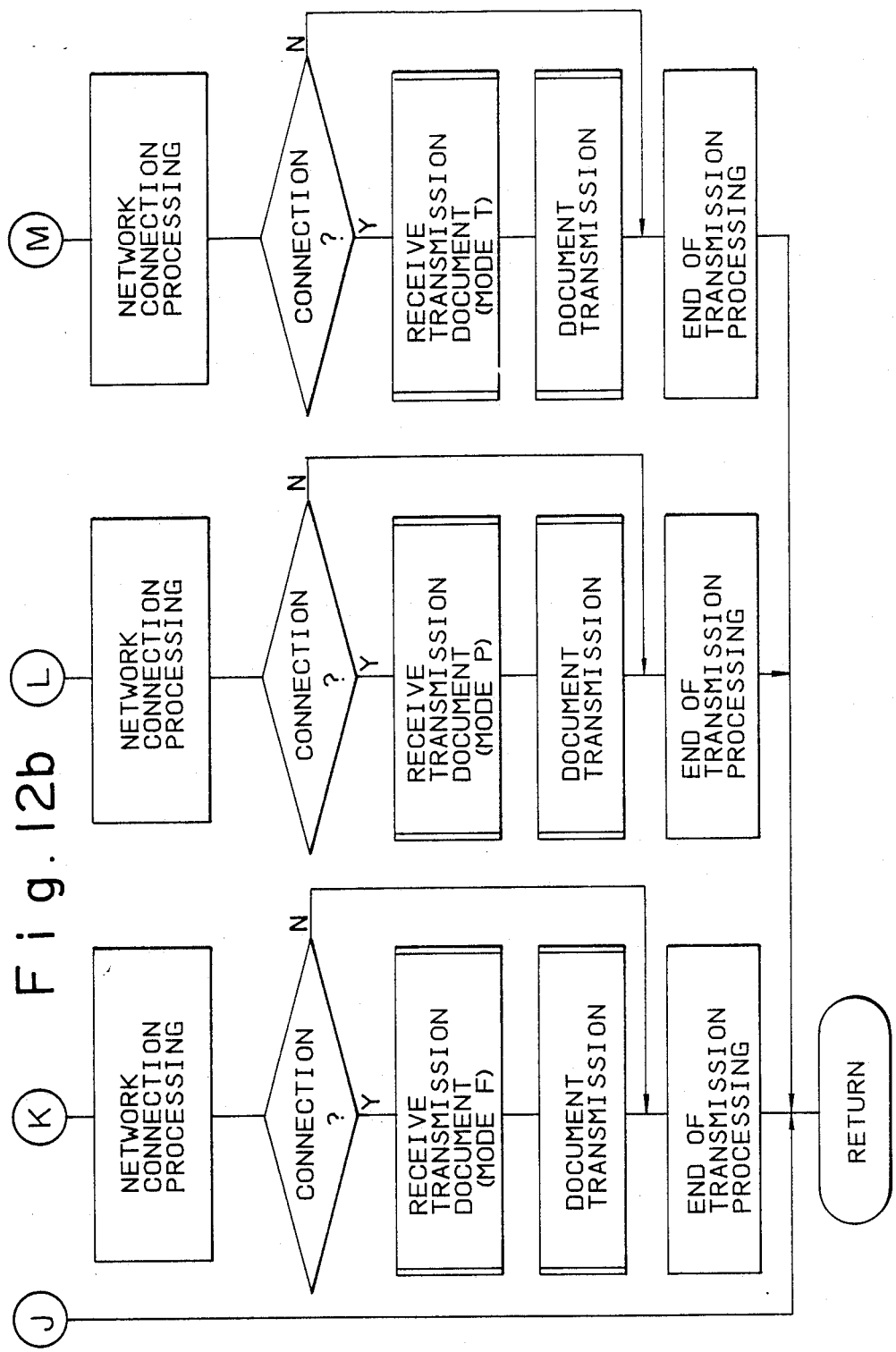

Next, the transmission preparation processing operation will be described in detail with particular reference to FIG. 9 (SCU side) and FIG. 10 (CCU side). In this transmission preparation processing operation, the system control unit (SCU) 9 supplies transmission information, such as the address (telephone number) of a designated destination, the name of a document to be transmitted, time of transmission, and relay transmission designation information if relay transmission has been designated, to the communication control unit (CCU) 11. On the other hand, in accordance with a predetermined command from the SCU 9, the CCU 11 initiates the implementation of the sequence shown in FIG. 10, thereby receiving the transmission information supplied from the SCU 9 and have it stored in the internal memory. If the CCU is not in a condition to receive information from the SCU because, for example, of the CCU 11 being currently in the middle of document transmission with another communication terminal apparatus, the operation, such as transmission and reception of the transmission information with the SCU 9, is temporarily halted to be set in a stand-by status until the current communication is completed.

Thereafter, the SCU 9 requests a transmission file No. to the CCU 11 which thus supplies a predetermined transmission file No. in response to this request. This transmission file No. is a file No. for internal processing. Here, use is made of "TDOC-XXX" which indicates the teletex mode. Upon receipt of the transmission file No. from the CCU 11, the SCU 9 reads the apparatus type information of the designated destination registered in the address list to determine whether or not it is a facsimile mode (mode F). Under the condition, if the transmission mode is mode F, then the SCU 9 changes the transmission file No. received from the CCU 11 from "TDOC-XXX" indicating teletex mode to "FDOC-XXX" indicating facsimile mode and supplies it to the CCU 11. Then, the transmission document of the document name designated for transmission is read out of the FDD 8, and, after adding the changed file No. "FDOC-XXX" to the document, it is registered in the transmission file defined by the HDD 7.

On the other hand, if the transmission mode is not mode F, then it is checked whether or not it is a private mode (mode P). If the transmission mode is mode P, then the SCU 9 changes the transmission file No. received from the CCU 11 from "TDOC-XXX" indicating the teletex mode to "PDOC-XXX" indicating the private mode and supplies the changed file No. to the CCU 11. Then, the transmission document of the document name designated for transmission is read out of the FDD 8, and, after adding the changed file No. of "PDOC-XXX" to the document, it is registered in the transmission file defined by the HDD 7.

In this case, if the relay transmission designation has been added to the transmission document, the relay control file formed and retained by the document transmission processing operation as described before with reference to FIG. 9 is added to a predetermined page, e.g., page 1, of the transmission document of the transmission document name, and, then, this transmission document with added information is stored as a transmission document in the transmission file.

On the other hand, if the transmission mode is not mode P and mode T of teletex mode, then the transmission document of the designated document name is read out of the FDD 8 and the file No. "TDOC-XXX" of teletex mode received from the CCU 11 is added to the document thus read out and registered in the transmission file. If the CCU 11 receives the transmission file No. from the SCU 9, it changes the transmission file No. supplied to the SCU 9 to the transmission file No. received from the SCU 9 and has it registered.

Next, the transmission processing operation to be carried out by the system control unit 9 and the communication control unit 11 will be described in detail with reference to FIGS. 11a–11b and 12a–12b.

The communication control unit (CCU) 11 sets the transmission status ON, i.e., requesting transmission, when the time has come if the transmission time has been designated, or immediately if no specific transmission time has been designated. On the other hand, the system control unit (SCU) 9 checks to see whether the transmission status has become ON by polling the CUU 11 at a predetermined time interval, and when the transmission status has become ON, i.e., upon request for transmission, the SCU 9 requests the CCU 11 the transmission file No. for transmission. On the other hand, upon receipt of a request of a transmission file No., the CCU 11 supplies a transmission file No. to the SCU 9 and waits for a further command from the SCU 9. Under the condition, the SCU 9 determines the transmission file No. received from the CCU 11 to be either one of "FDOC-XXX", "PDOC-XXX", and "TDOC-XXX", thereby determining the transmission mode to be either one of mode F (facsimile mode), mode P (private mode), and mode T (teletex mode).

If the transmission file No. has been found to be a transmission file No. of mode F, then a mode F transmission document command is supplied to the CCU 11; in the case of a transmission file No. of mode P, a mode P transmission document command is supplied to the CCU 11; and in the case of a transmission file No. of mode T, a mode T transmission document command is supplied to the CCU 11. Thus, the CCU 11 determines the command received from the SCU 9 to be a transmission document command of either one of mode F, mode P or mode T, and depending on the result of this determination, the CCU 11 carries out a network connecting processing operation with a transmitting (receiving) terminal apparatus in accordance with the facsimile communication procedure, private communication procedure added to the teletex communication regulations, or teletex communication procedure. Then, when communication is made possible, for example, by establishing a connection with another terminal apparatus through the network, the transmission document supply and reception processing operation is carried out between the SCU 9 and the CCU 11 so that the transmission document information is supplied from the SCU 9 to the CCU 11 in accordance with the selected transmission mode (mode F, P or T).

In the case of mode F, the SCU 9 changes the transmission document information from the character code into image data, for example, by using the bit map memory of the CRTCU 10, and, then, the image data is further converted into compression code according to the facsimile communication regulations. Thus converted compression code is then supplied to the CCU 11. In the case of mode P, the SCU 9 supplies the transmission document information to the CCU 11 without change; whereas, in the case of mode T, the transmission document information is converted into data in compliance with a teletex terminal apparatus, and, then, the thus converted data is supplied to the CCU 11. Thereafter, the CCU 11 transmits the transmission document information received from the SCU 9 to a destination terminal apparatus in accordance with the transmission mode (mode F, P or T).

Upon completion of supply of the transmission document to the CCU 11 or in the case of the condition of transmission impossible, the SCU 9 immediately carries out a transmission termination processing operation, and, then, the CCU 11 carries out the transmission termination processing operation upon completion of transmission of the transmission document to the destination terminal apparatus or in the case of being incapable to establish a connection through network, thereby completing a series of processing operations.

Now, transmission of relay communication designation information and a relay control file will be described in detail below.

As well known in the art, the communication protocol in teletex has a seven-layered structure, including a physical layer (layer 1) for physical conditions, such as MODEM and pin arrangement, a link layer (layer 2) for a communication control procedure, a network layer (layer 3) for a routine control within network, a transport layer (layer 4) for absorbing the differences in network, a session control layer (layer 5) and a document control layer (layer 5) as a session layer for transmission and reception control of data or the like, presentation layer (layer 6) for encoding of data, formatting, or the like. In the present communication terminal apparatus, the communication control unit 11 takes care of layers 1 through 5 and a part of layer 6, and the system control unit 9 takes care of the rest of layer 6. And, various commands and responses necessary to implement the session and document controls are defined in the session control and document control layers within the session layer.

In the present embodiment, relay transmission designation information is added in session start (CSS) and session start confirmation (RSSP) which is a command and response used in the session control layer, to which a privately used parameter can be added. Alternatively, used may also be made of a command and response, such as document function list (CDCL) and document function list confirmation (RDCLP) which is used in the document control layer and which allows to use a privately used parameter. In addition, as described before, the relay control file is transmitted as a part of the document. In this case, the relay control file is always stored on a predetermined page (here, page 1) of the document. Thus, in the transmission document supply and reception processing operation in mode P in FIGS. 11a–11b and 12a–12b, the relay control file is supplied from the system control unit 9 to the communication control unit 11 as a transmission document and it is transmitted to the destination communication terminal apparatus.

Next, the processing operation when the present communication terminal apparatus receives a document added with relay transmission designation from a transmitting communication terminal apparatus having a comparable function as that of the present communication terminal apparatus will be described in detail below with reference to FIG. 13 (CCU side), FIG. 14 (SCU side) and FIG. 15, which shows an example of a communication protocol sequence.

Figure 13:
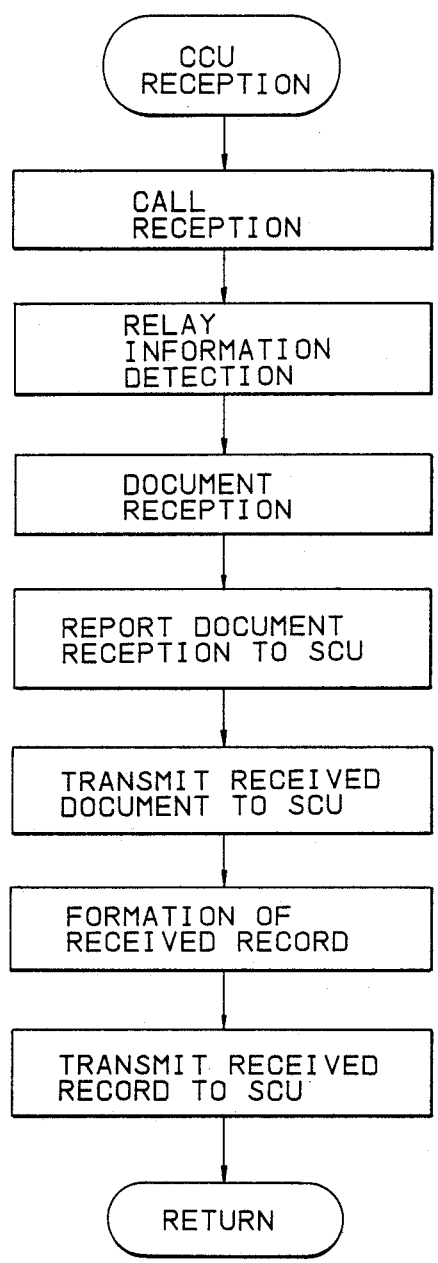
FIGS. 13 and 14 are flow charts showing one example of document reception processing.
Figure 15B:
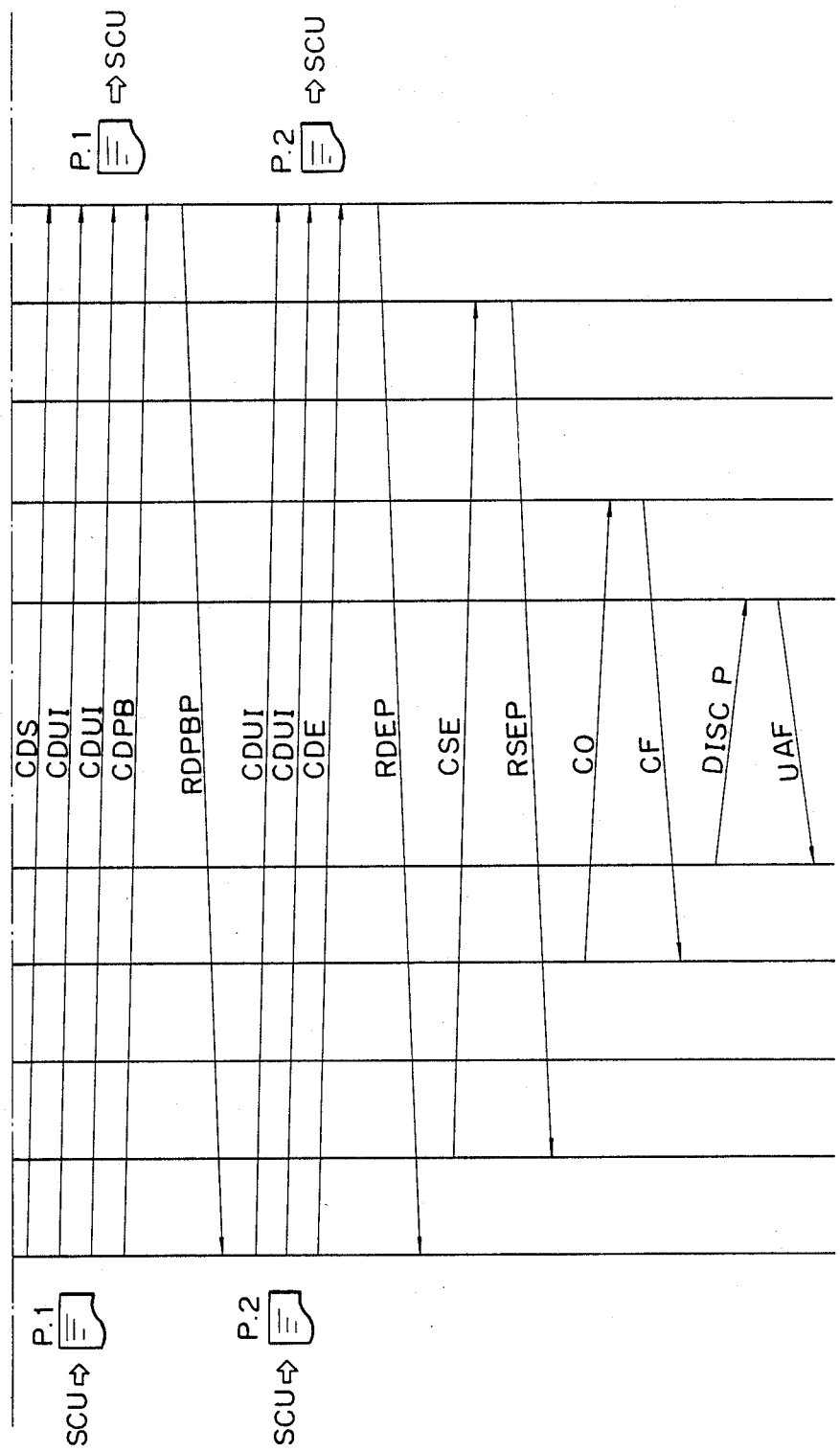

In the first place, upon receipt of a call request from another communication terminal apparatus, the communication control unit 1 carries out a call reception processing operation to establish a connection through the network as shown in FIG. 13. This call reception processing operation is an operation up to the establishment of connection of the transport level shown in FIGS. 15a–15b. That is, as shown in FIGS. 15a–15b, in the like level, the calling station requests setting of asynchronous equilibrium mode (SABM P), and, in response thereto, the called station issues a non-number confirmation response (UA F), thereby establishing a connection of link level. Incidentally, "P" and "F" in such request and response signify a poll bit (P bit) and a final bit (F bit), and the method of their use is explained in the recommendations. Then, at the network level, the calling station places a call request (CR), and, in response thereto, the called station returns a call acknowledgement response (CA), thereby establishing a connection of network level. Then, at the transport level, the calling station places a connection request (TCR), and, in response thereto, the called station checks the parameter (address, length of longest data, etc.) of the transport connection request and issues a connection response (TCA) since it can be accepted, thereby establishing a connection of transport level. In this manner, after the communication control unit 11 has carried out the call reception processing operation up to establishment of a connection of transport level, it proceeds to the session control level to establish the session level which includes detection processing of relay transmission designation information as a part thereof.

That is, as shown in FIGS. 15a–15b, upon having proceeded to the session control of session level, if the calling station designates relay transmission to this terminal apparatus, then it issues a session start request (CSS) which has relay transmission designation information as a parameter, as described before. Thus, in response to this session start request (CSS), the called station examines the requested parameters (identification of calling station, date and time information, relay transmission designation information, etc.) and issues a session start response (RSSP) since acceptable. In this manner, upon receipt of the parameters of relay transmission designation information in the session control from the transmitting terminal apparatus, the communication control unit 11 stores them therein. Thereafter, the communication control unit 11 proceeds to the document control layer of session layer to receive the document being transmitted and have it stored in the internal communication memory.

That is, as shown in FIG. 15, in the document control of session level, the calling station issues a document start (CDS) and then transfers the document (CDUI), whereby the calling station transmits a document boundary (CDPB) upon completion of transfer of a single page of document. Under the condition, the called station examines whether or not it can take responsibility for the single page thus transferred and then, since it can be responsible, it accepts the single page of document and has it stored in the internal communication memory. And, then, the called station transmits a page boundary confirmation (RDPBP) to the calling station. Incidentally, as described previously, if relay transmission has been designated, this page 1 of document constitutes information of a relay control file.

Since the calling station transfers two pages of document in this example, the document is transferred once again from the calling station, and upon completion of this second transfer, the calling station transmits a document end (CDE). In response thereto, the called station returns a document end confirmation (RDEP). Thereafter, it proceeds to the session control of session level, where the calling station designates a session end (CSE). In response thereto, the called station transmits a session end response (RSEP). And, then, at the network level, the calling station issues a restore request (CQ), and, in response thereto, the called station transmits a disconnection confirmation (CF). Then, at the link level, the calling station issues a disconnection request (DISCP), and, in response thereto, the called station issues a non-number confirmation (UAF), thereby disconnecting the connection at the link level. The transport connection is also disconnected in synchronism therewith.

In this manner, when the communication control unit 11 has received all of the document from the calling station (transmitting communication terminal apparatus), it apprises of reception of document to the system control unit 9 and supplies the received document to the system control unit 9. Thereafter, a received record is formed and this received record is supplied to the system control unit 9. As described before, if relay transmission designation has been detected during the detection processing operation of relay transmission designation information, the information regarding this fact is added to the received record.

Figure 14:
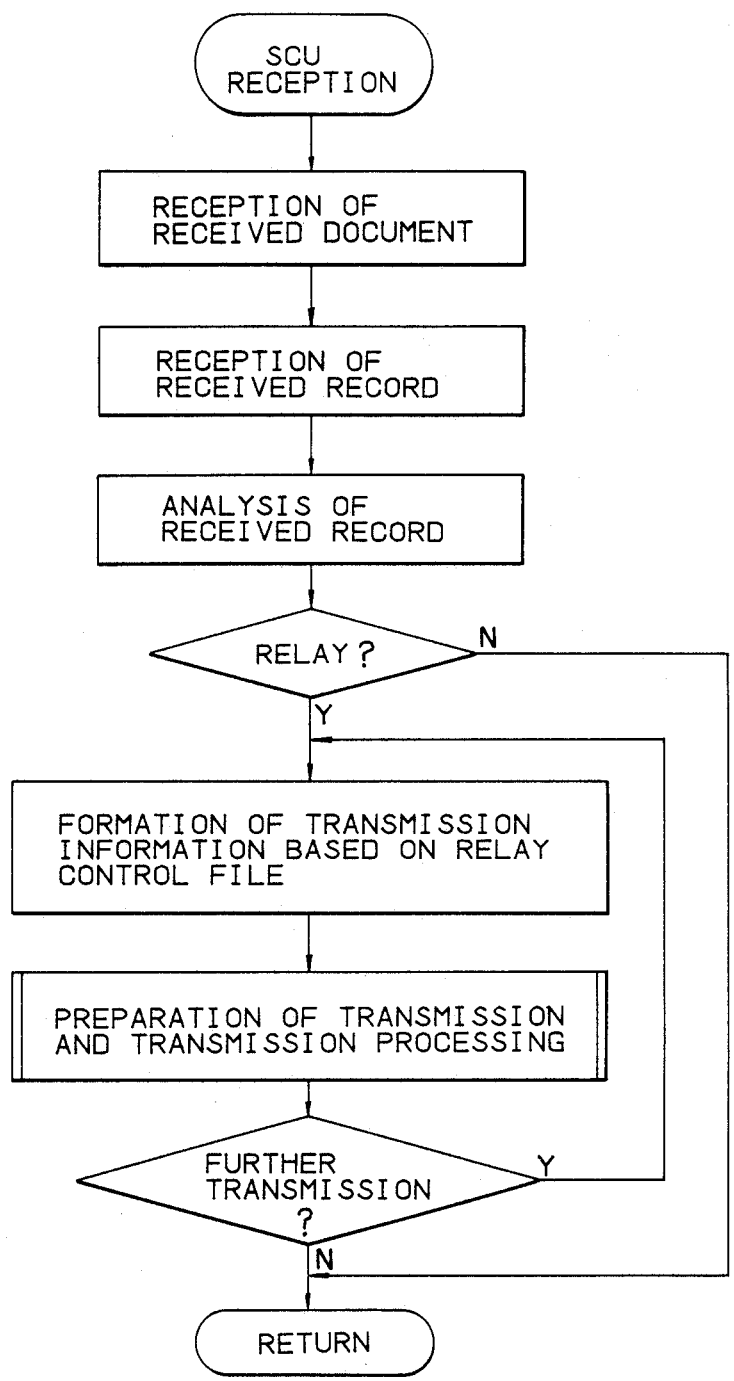

On the other hand, if a received document reception request is issued from the communication control unit 11, the system control unit 9 receives the received document supplied from the communication control unit 11 and has it stored in the received document file, as shown in FIG. 14, and it also receives received record information supplied thereafter and has it stored in the received record file. Then, the received record received from the received record file is read out to examine whether or not relay transmission designation information is contained, thereby determining whether or not it is relay transmission of a received document. If it is, in fact, relay transmission of a received document, the relay control file stored on the first page of the received document now stored in the received document file is read out to form relay transmission information including final destination address information and apparatus type information of the destination apparatus.

Thereafter, it proceeds to the previously described SCU transmission preparation processing operation. Similarly, upon receipt of transmission status ON from the communication control unit 11, it also proceeds to the previously described SCU transmission processing operation. And, if necessary, data conversion is carried out for the received document (excepting the relay control file) in relation to the designated final destination, and, then, the converted document is supplied to the communication control unit 11 for transmission to the final destination communication terminal apparatus. Then, upon completion of relay transmission of the received document, it is checked whether or not the received document has been relay transmitted to all of the final destinations registered in the relay control file, and if there is a remaining destination, then the above-described processing operation is repeated, so that the received document excepting the relay control file is relay transmitted to all of the final destinations registered in the relay control file.

Figure 16:
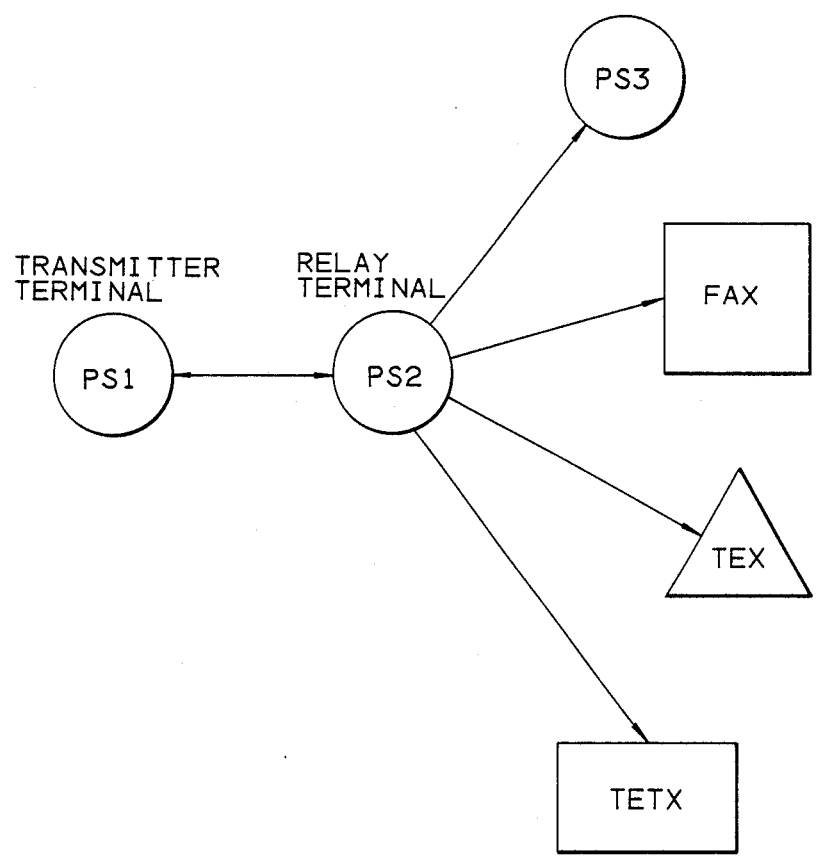
FIG. 16 is a schematic illustration which is useful for explaining the principle of one aspect of the present invention for transmitting information to one or more of destination terminal apparatuses via a relay terminal apparatus.

With the above-described processing operation, as shown, for example, in FIG. 16, the present communication terminal apparatus PS2 can serve as a relay terminal apparatus by receiving a transmission document from a transmitting communication terminal apparatus PS1 comparable in function as the present invention PS2 (i.e., having also a communication function with a telex) and transmitting the same transmission document to a receiving communication terminal apparatus PS3 also comparable in function as the present apparatus PS2, to a facsimile apparatus FAX, to a telex apparatus TEX and to a teletex apparatus TETX. In this case, relay transmission designation information, relay control file information and transmission document information are transmitted from the transmitting communication terminal apparatus PS1 to the present document processing communication terminal apparatus PS2 comparable in function as the transmitting apparatus PS1 and serving as a relay station. Thus, the present communication terminal apparatus PS2 transmits the received document to the communication terminal apparatus PS3, to the facsimile apparatus FAX, to the telex apparatus TEX and to the teletex apparatus TETX, whereby the present apparatus PS2 serves as a relay station.

Accordingly, even if the source station of communication terminal apparatus PS1 is located far apart from each of the destination stations of communication terminal apparatus PS3, facsimile apparatus FAX, telex apparatus TEX and teletex apparatus TETX, the source station of communication terminal apparatus PS1 can first transmit the transmission document to the relay station of communication terminal apparatus PS2 which is located closer to the destination stations, so that the overall communication time can be reduced significantly and the same document can be transmitted to a plurality of destination stations most efficiently, if they are located far away from the source station.

As described above, the present document processing communication terminal apparatus is provided with a function of transmitting information received from a source station to one or more of designated destination stations, thereby serving as a relay station, so that the provision of the present communication terminal apparatus in the network allows to obtain an enhanced communication efficiency. In addition, by providing a function of converting the format of received data in association with the type of the apparatus at a designated destination station to the present communication terminal apparatus, even if the source station cannot directly transmit a document to the destination station, the document can be transmitted via the present communication terminal apparatus with data conversion. Thus, the present communication terminal apparatus allows to carry out a communication between two terminal apparatuses different in type connected in the same network. It is to be noted, however, that the present communication terminal apparatus does not always have to include all of the transmission functions of teletex mode, private mode and facsimile modes as in the case of the above-described embodiment. It may include one or some of these modes or may include one or more of some other modes, if necessary.

Now, the second aspect of the present invention will be described in detail below. In accordance with this aspect of the present invention, there is provided a communication terminal apparatus having a broadcasting function for transmitting the same information to a plurality of destination stations simultaneously or in sequence and also a relaying function for relaying the information received from a source station to a destination station. In the communication terminal apparatus constructed in accordance with this aspect of the present invention, when broadcasting communication is designated, desired information is transmitted to one or more of selected communication terminal apparatuses having a relaying function based on the stored information relating to relay communication terminal apparatuses. That is, when communication is to be carried out in a broadest mode, the present communication terminal apparatus examines the stored information regarding communication terminal apparatuses connected to the same network and having a relaying function and selects one or more of the communication terminal apparatuses as relay stations, so that the transmitting information is transmitted to destination stations via these selected relay stations.

The communication terminal apparatus constructed in accordance with this aspect of the present invention may have the structure illustrated in FIGS. 2 through 7 and described above with respect to the first aspect of the present invention, so that the description will not be repeated here.

Figure 17A:
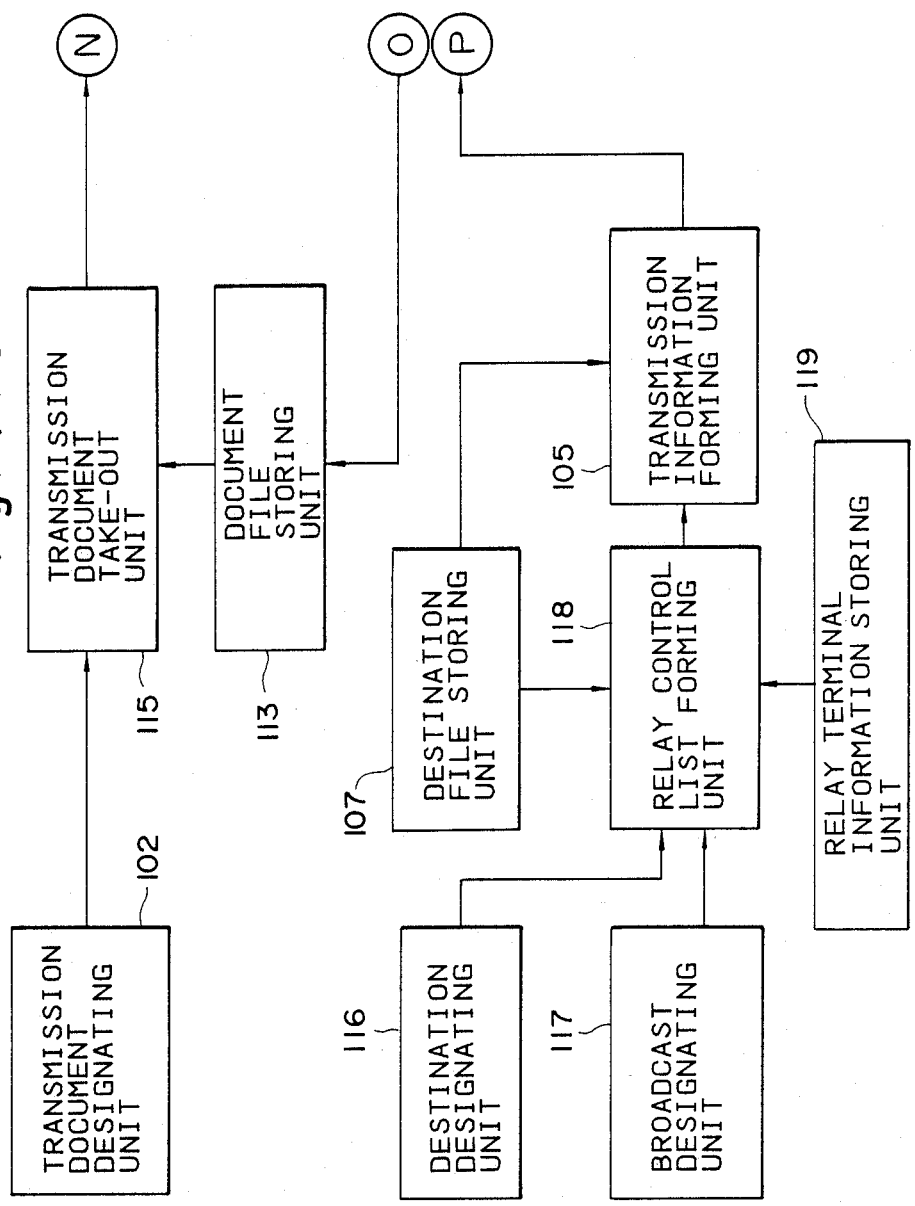
FIGS. 17a and 17b, when combined as illustrated in FIG. 17, define a block diagram showing a communication terminal apparatus constructed in accordance with another embodiment of the present invention.
Figures 17, 17B:
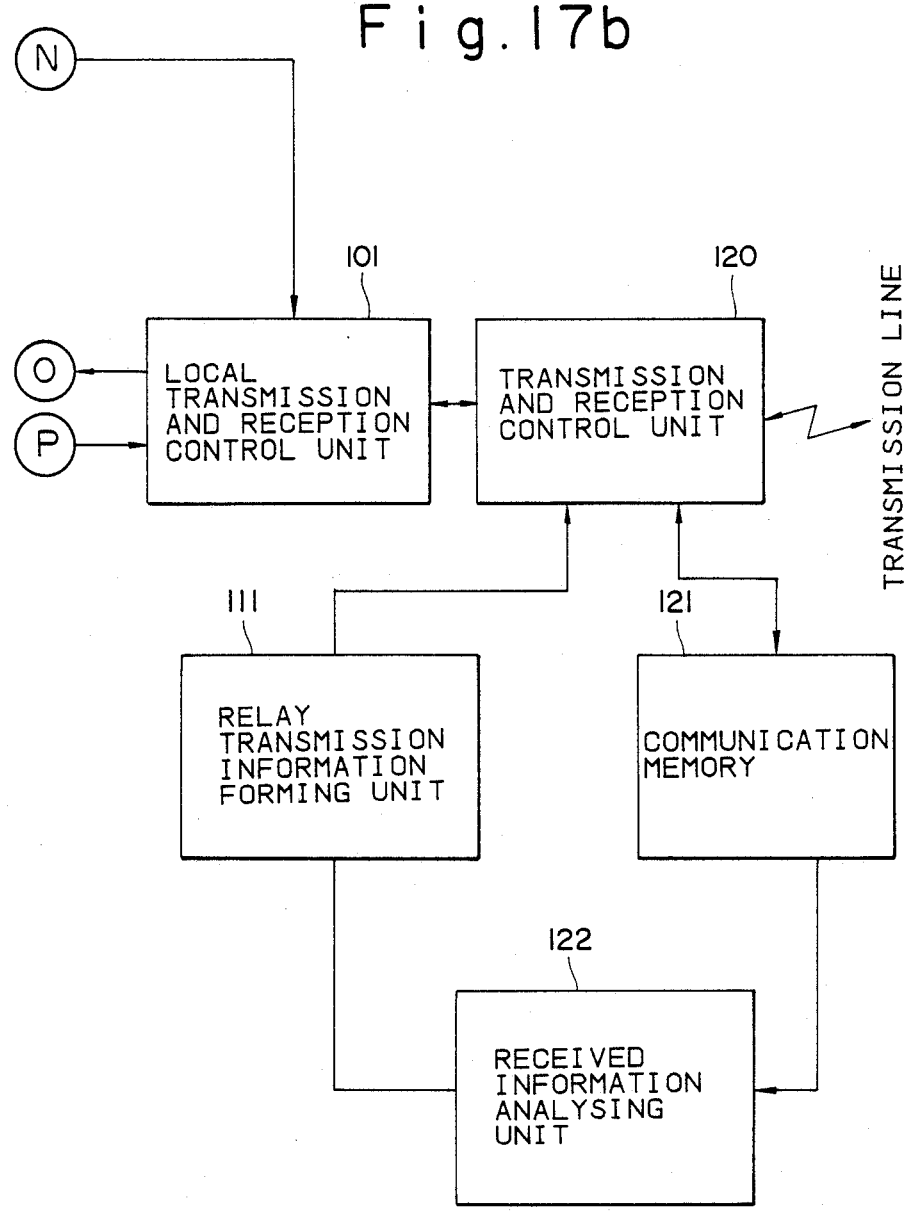
FIG. 17 is a schematic illustration showing how to combine FIGS. 17a and 17b.

FIGS. 17a and 17b, when combined as shown in FIG. 17, show in functional block form that portion of the present communication terminal apparatus which relates to a relayed broadcast control operation. As shown, there is provided a local transmission and reception control unit 101 which supplies various information from various parts of the system side to a transmission and reception control unit 120 at the communication control side and also receives information from the transmission and reception control unit 120. A transmission document designating unit 102 designates the name of a document to be transmitted. A destination designating unit 116 designates the address or final destination to which the transmitting document is to be transmitted via a relay station. Also provided is a broadcast designating unit 117 which designates broadcast communication. A destination file storing unit 107 stores a destination file including such information as transmission mode, address, type of apparatus of each of the terminal apparatuses connected to the network. A relay terminal information storing unit 119 stores relay terminal information relating to those communication terminal apparatuses having a relay function.

A relay control list forming unit 118 reads out information, such as address, of the destination (communication terminal apparatus to which a document is to be transmitted) designated by the destination designating unit 116 from the destination file storing unit 107 when the mode of broadcast communication has been designated by the broadcast designating unit 117, and, then, forms a relay control list including such information as decision to use which of the relay communication terminal apparatuses for the designated destination based on the relay terminal information stored in the relay terminal information storing unit 119. The relay control list thus formed by the relay control list forming unit 118 is supplied to a transmission information forming unit 105 which also receives such information as the communication mode of the destination communication terminal apparatus and of the relay communication terminal apparatus from the destination file storing unit 107, thereby forming transmission information comprised of the transmission mode information of the destination communication terminal apparatus and the relay information, such as the address information and transmission information of the relay communication terminal apparatus obtained from the received relay control list. And, thus formed transmission information is then supplied to the transmission and reception control unit 120 via the local transmission and reception control unit 101.

A transmission document take-out unit 115 takes out a document to be transmitted designated by the transmission document designating unit 102 from a document file storing unit 113 which stores document information and then supplies the thus taken-out document to the transmission and reception control unit 120 via the local transmission and reception control unit 101. Upon receipt of transmission information and transmission document information supplied from the local transmission and reception control unit 101, the transmission and reception control unit 120 causes these information to be once stored in a communication memory 121 and transmits the transmission document information and relay information to be designated communication terminal apparatus. The transmission and reception control unit 120 also receives document information and relay information being transmitted from a source station and has these information stored in the communication memory 121 as received information. Moreover, the transmission and reception control unit 120 transmits the received document information stored in the communication memory 121 to a designated destination station in accordance with the relay transmission information supplied from a relay transmission information forming unit 111 which will be described later in detail.

A relay information analyzing unit 122 analyzes the received information stored in the communication memory 121, thereby taking out the relay information from this received information and supplying the relay information to the relay transmission information forming unit 111. Upon receipt of the relay information from the received information analyzing unit 122, the relay transmission information forming unit 111 forms relay transmission information comprised of address information and the like of a relay station and supplies the thus formed relay transmission information to the transmission and reception control unit 120.

Now, the operation of the present document processing communication terminal apparatus having the above-described structure and shown in FIGS. 17a and 17b will be described in detail below.

In the first place, the transmission mode of the present document processing (forming) communication terminal apparatus include (1) a teletex mode for transmission to a teletex terminal apparatus and (2) a fascimile mode (also referred to as "mode F") for transmission to a facsimile terminal apparatus. The teletex mode is further divided into two modes, one of which is a teletex mode for transmission to a terminal apparatus having a standard teletex communication function based on the CCITT recommendations or the like (referred to as "mode T") and the other of which is a private mode for transmission to a communication terminal apparatus having a private communication function as well as a standard teletex communication function similar to the transmitting terminal apparatus (referred to as "mode P"). In the present document processing communication terminal apparatus, there is previously registered a destination (address) list containing the name of a destination communication terminal apparatus, the address (such as a telephone number), and the type of the destination communication terminal apparatus, i.e., which of the above-described transmission modes (mode F/T/P) is possessed by the destination communication terminal apparatus, thereby identifying the destination communication terminal apparatus to be serving as a fascimile terminal apparatus, a teletex terminal apparatus, or a private teletex terminal apparatus.

Figure 18A:
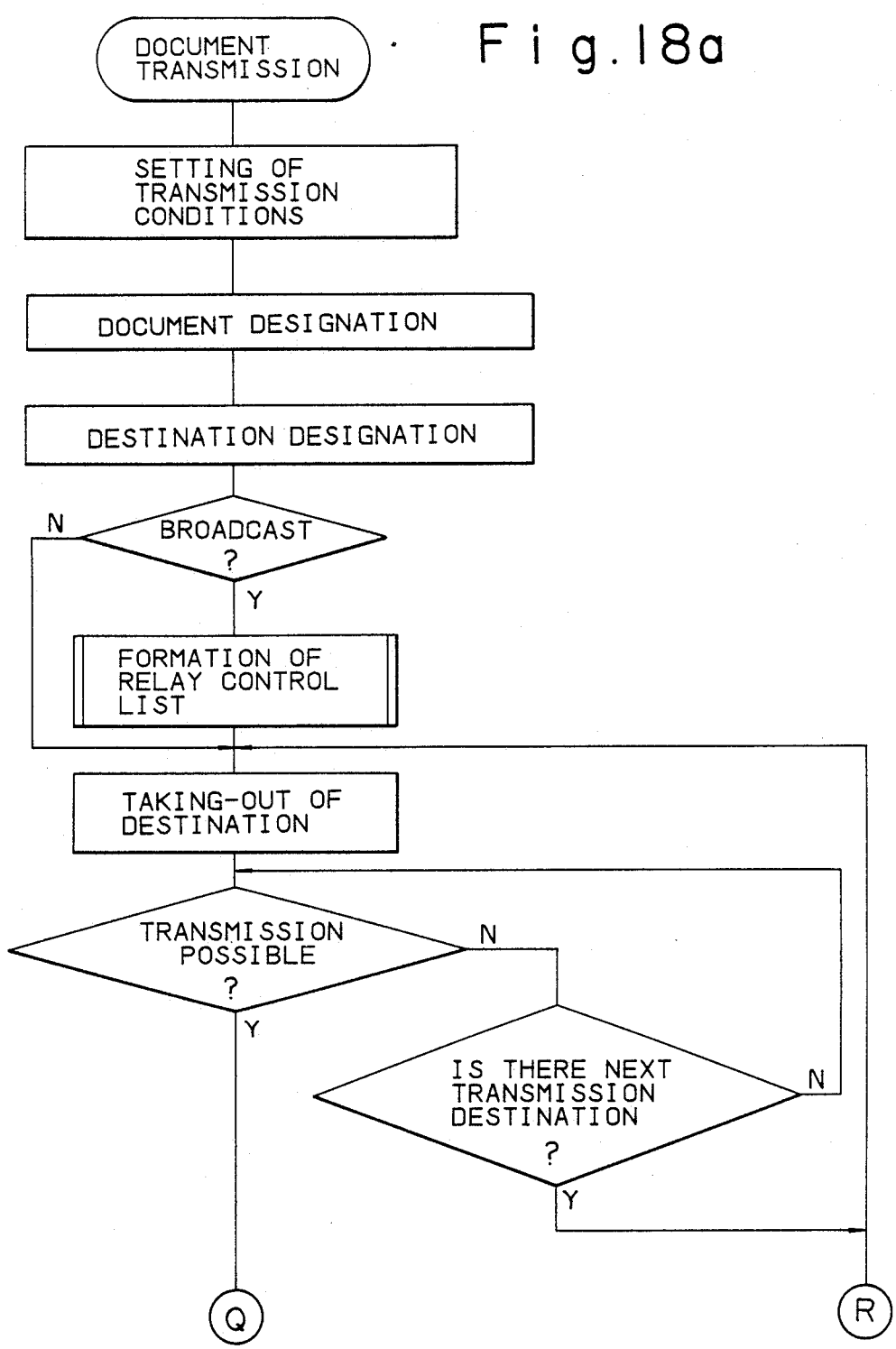
FIGS. 18a and 18b, when combined as illustrated in FIG. 18, define a flow chart showing the document transmission processing operation to be implemented by the structure shown in FIGS. 17a and 17b.
Figure 18B:
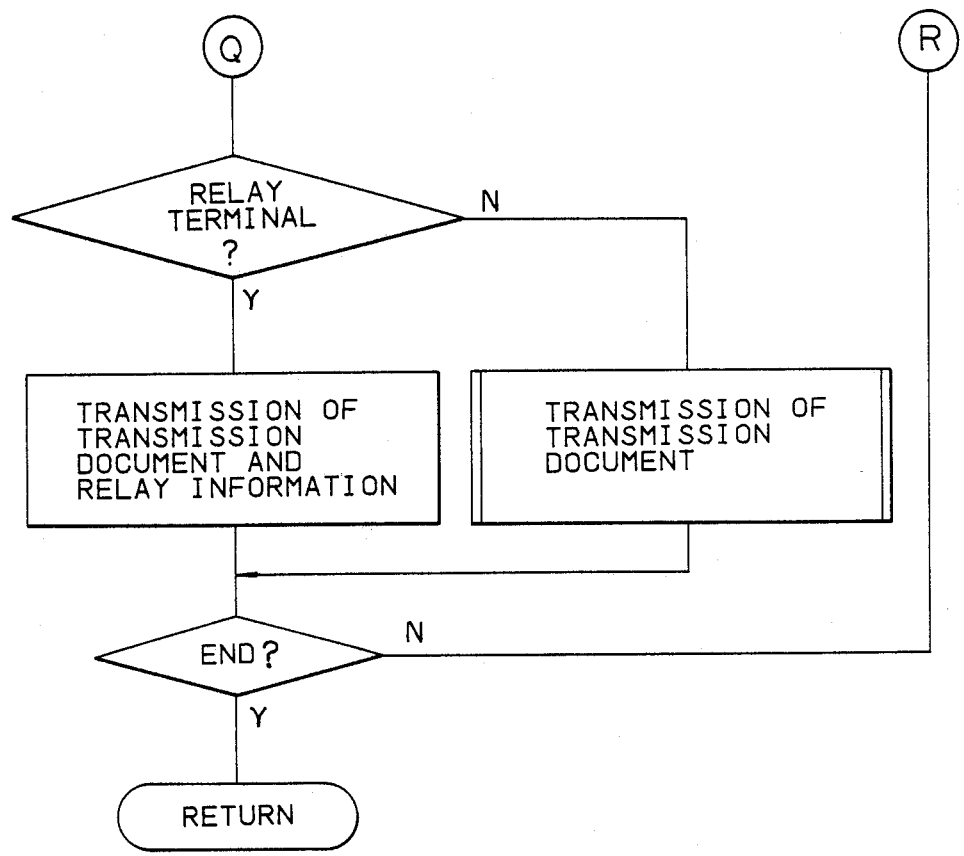
Figure 18:
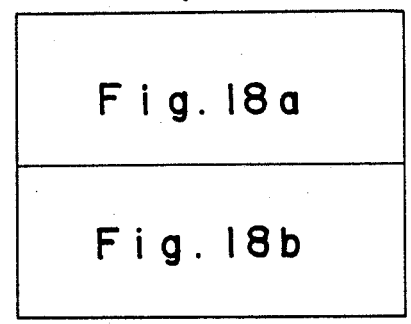
FIG. 18 is a schematic illustration showing how to combine FIGS. 18a and 18b.

Now, the document transmission processing operation implemented by the present document processing communication terminal apparatus will be described in detail also with reference to FIGS. 18a and 18b. When document transmission among a teletex communication menu in a task selection step not shown has been selected, a menu for setting the transmission condition for document transmission is displayed on the screen, whereby the transmission condition setting processing is carried out for transmission mode (ordinary transmission, urgent transmission, broadcast transmission, etc.), time of transmission, and contents of transmission (e.g., Japanese) by key operation. Upon completion of this transmission condition setting processing, the document name registered in the document file is read out and a menu of document name list is displayed on the screen, whereby a particular document name for transmission is designated by key operation to implement a document designation step. After this document designation step, it is checked whether or not broadcast transmission is designated at a transmission condition setting step.

If broadcast transmission is designated, the relay control list is formed by the later-described relay control list forming processing operation. Then, the designated destination is taken out and it is determined whether or not transmission can be carried out to the designated destination. If not possible, it is checked whether or not there is a next destination. If there is, then it proceeds to a step of taking out the next destination and waits until the thus taken-out destination becomes available for communication. When becoming available, it is determined whether or not the receiving station is a relay station, and if the receiving station has been found to be a relay station, then the transmission document and the relay information containing the address of the final destination are transmitted. On the other hand, if the receiving station is not a relay station, then only the transmission document is transmitted, and, thereafter, it is checked whether or not transmission to all of the designated destinations has been completed, and the present document transmission processing operation is terminated upon completion of transmission to all of the designated destinations.

Figure 19B:
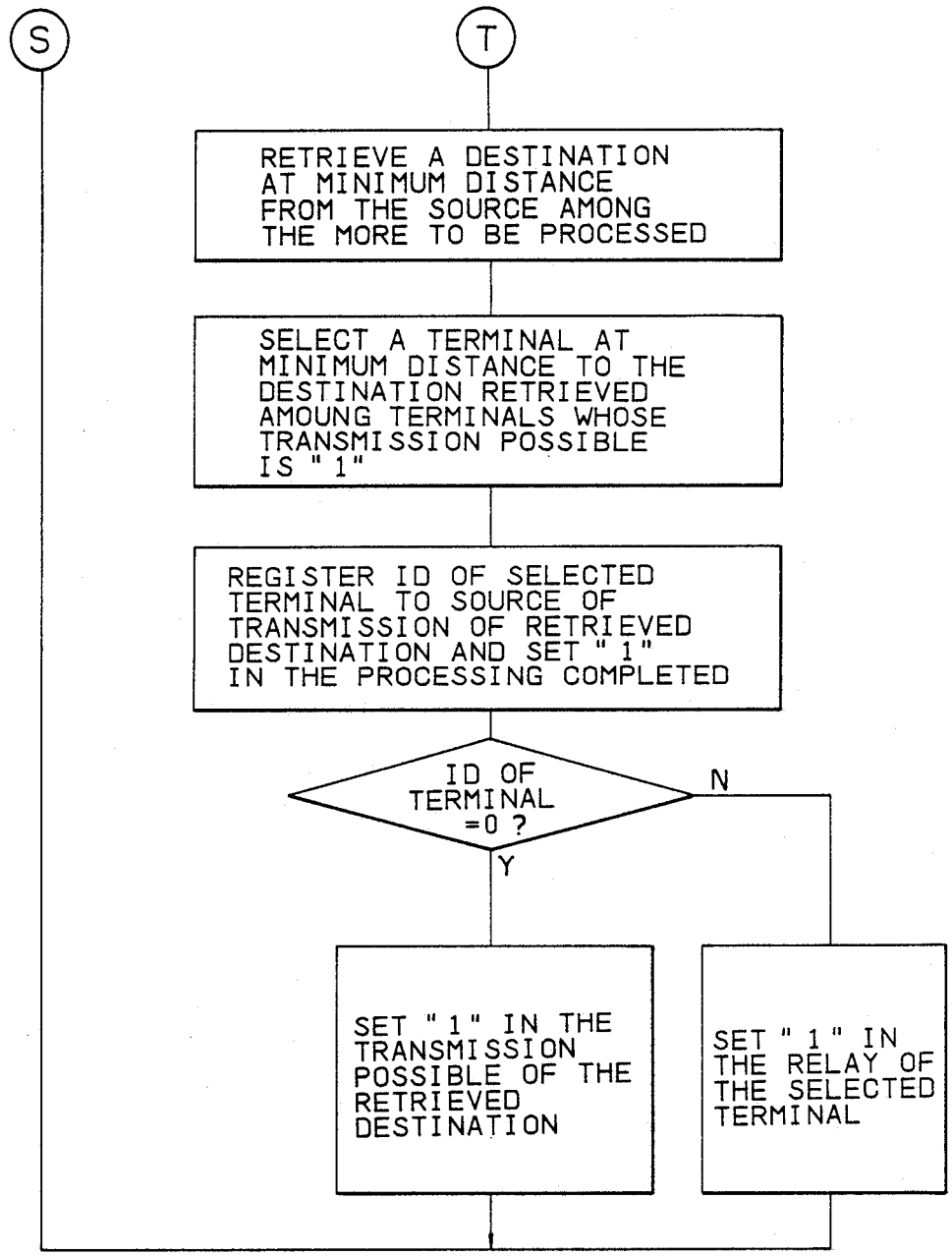

Next, the relay control list forming processing operation will be described with reference to FIGS. 19a and 19b. In the first place, the contents of relay terminal information and the format of a relay control list will be described. The relay terminal information may include any information which can determine a cost of communication, such as distance information to a relay communication terminal apparatus, location information of a relay communication terminal apparatus, or communication cost information per unit time with a relay communication terminal apparatus. In the present embodiment, the distance information between the source station and a relay station is listed as relay terminal information, for example, as shown in FIG. 20 and registered as a file in the HDD 6. In the table shown in FIG. 20, "A" through "E" indicate communication terminal apparatuses located at different locations, such as A=Tokyo, B=Sendai, C=Niigata, and D=Kanazawa.

Then, referring to this relay terminal information list with respect to the destination stations designated for broadcast communication and the source station, a relay control list of the format shown in FIG. 21 is formed. In the leftmost column for "ID" in this relay control list, a particular number is assigned for each of the communication terminal apparatuses in question. For example, "0" is assigned to the source station and the designated destination stations are numbered "1", "2", etc. In the next column of "ADDRESS", the address (telephone number) of the corresponding communication terminal apparatus is stored. In the third column of "SOURCE OF TRANSMISSION" is stored the ID of the communication terminal apparatus which serves as a source station to indicate from which the document is transmitted. The fourth column is "TRANSMISSION POSSIBLE" in which the information indicating whether or not the transmission of received document information is possible ("1" is set only for a relay terminal). The fifth column is "PROCESSING COMPLETED" which stores the information which indicates whether or not the formation of a relay control list has been completed ("1" is set only when completed). The final column is "RELAY" which stores the information indicating whether or not the receiving station is a relay station as viewed from the transmitting station ("1" is set only when the receiving station is a relay station as viewed from the transmitting station.).

Described this relay control list forming processing operation, in the first place, the ID and address of each of the present and designated stations are stored in "ID" and "ADDRESS" columns, respectively. And, then, after setting "1" in the "TRANSMISSION POSSIBLE" column of the present station, the nearest communication terminal station which is located at the nearest distance from the present station is retrieved based on the relay terminal information list, which is followed by the steps of setting the ID "0" of the present station in the column of "SOURCE OF TRANSMISSION" of the thus retrieved receiving station and setting "1" in each of the "TRANSMISSION POSSIBLE" and "PROCESSING COMPLETED" columns. Then, it checked whether or not there still remains yet to be processed (i.e., "0" in the column of "PROCESSING COMPLETED") by scanning the column of "PROCESSING COMPLETED" for each of the IDs in the relay control list. If there still remains the unprocessed, then the newest communication terminal apparatus which is located at the shortest distance to the present station among the unprocessed is retrieved, and, then, a communication terminal apparatus which is nearest to the thus retrieved terminal apparatus is selected among those terminal apparatuses having "1" in their column of "TRANSMISSION POSSIBLE", which is followed by the steps of registering the ID of the thus selected terminal apparatus in the column of "SOURCE OF TRANSMISSION" of the thus retrieved terminal apparatus and of setting "1" in the column of "PROCESSING COMPLETED".

Then, it is checked whether or not the terminal apparatus ID registered in the column of "SOURCE OF TRANSMISSION" of the thus retrieved terminal apparatus is "0", indicating the fact that the source of transmission is the present station. And, if the terminal apparatus ID has been found to be "0", then "1" is set in the column of "TRANSMISSION POSSIBLE" of the thus retrieved terminal apparatus and "1" is also set in the column of "RELAY" of the thus selected terminal apparatus (excepting the present station).

The relay control list forming processing operation will be described with reference to FIG. 22. For the purpose of illustration, it is assumed here that, among the terminal apparatuses A through E in the table of FIG. 20, the terminal apparatus A is the present (or self) station and the remaining terminals B through E are designated terminal apparatuses. Under the condition, the address of the present terminal apparatus A is stored in the column of "ADDRESS" corresponding to ID 0, and, similarly, the addresses of the terminal apparatuses B through E are stored in the column of "ADDRESS" corresponding to respective ID 1 through 4. Although not shown, it is to be noted that "0s" are set in the other columns of "SOURCE OF TRANSMISSION", "TRANSMISSION POSSIBLE", "PROCESSING COMPLETED", and "RELAY" as initial values. Thereafter, "1" is set in the column of "TRANSMISSION POSSIBLE" of the present station (i.e., terminal apparatus A), as shown in FIG. 22.

Under the condition, one of the designated stations which is located closest to the present station (terminal apparatus A) is retrieved. In the present example, from the relay terminal information list shown in FIG. 20, it is found that the terminal apparatus C (ID=2) is nearest to the present station, so that for the terminal apparatus C (ID=2), "0" (indicating the present station) is set in "SOURCE OF TRANSMISSION" and "1" is set in "PROCESSING COMPLETED". Thereafter, since the other terminal apparatuses B, D and E have not yet been processed, it is determined which of these three is located nearest to the present station and thus found that the terminal apparatus D is nearest to the present station among these three. Then, among those terminal apparatuses having "1" in "TRANSMISSION POSSIBLE", a terminal apparatus nearest to thus retrieved terminal apparatus D is selected. In this case, since only the present station (terminal apparatus A) and the terminal apparatus C have "1" in "TRANSMISSION POSSIBLE", the present terminal apparatus A is selected as the nearest terminal apparatus to the terminal apparatus D based on the information contained in the relay terminal information list shown in FIG. 20.

Accordingly, the ID "0" of the present terminal apparatus A is registered in "SOURCE OF TRANSMISSION" of the thus retrieved terminal apparatus D, and "1" is set in its "PROCESSING COMPLETED". Then, since ID=0 for the ID of the registered terminal apparatus, "1" is set in "TRANSMISSION POSSIBLE" of the thus retrieved terminal apparatus D. Thereafter, it again returns to a step for determining whether or not there still remains a terminal apparatus which has not yet been processed. In the present case, since the terminal apparatuses B and E have not yet been processed, it is examined which of the two is closer in distance to the present station. In the present example, based on the information contained in the table of FIG. 20, the terminal apparatus E is found to be closer. Then, it is examined which of the terminal apparatuses having "1" in "TRANSMISSION POSSIBLE", i.e., terminal apparatuses A, C and D, is located nearest to the terminal apparatus E. In the present example, based on the information contained in the relay terminal control information list shown in FIG. 20, the terminal apparatus D is selected. Accordingly, the ID of the terminal apparatus D (ID=3) is registered in "SOURCE OF TRANSMISSION" of the terminal apparatus E and "1" is set in "PROCESSING COMPLETED". In addition, since the thus registered ID is that of the terminal apparatus D (ID=3), "1" is set in "RELAY" of the terminal apparatus D.

Now, the terminal apparatus B still remains to be processed. Since it is the only one remaining to be processed, it is nearest to the present terminal apparatus A. Then, it is examined which of those terminal apparatuses having "1" in "TRANSMISSION POSSIBLE", i.e., terminal apparatuses A, C and D, is nearest to the terminal apparatus B. In the present case, as a result of this examination, the terminal apparatus C is selected. Accordingly, the ID of the terminal apparatus C (ID=2) is set in "SOURCE OF TRANSMISSION" of the terminal apparatus B, and "1" is set in "PROCESSING COMPLETED". In this case, since the registered ID is that of the terminal apparatus C (ID=2), "1" is set in "RELAY" of the terminal apparatus C.

In this manner, when all of the processings have been completed, "1s" are set in "SOURCE OF TRANSMISSION", "TRANSMISSION POSSIBLE", and "RELAY" of the terminal apparatuses C and D with "2" set in "SOURCE OF TRANSMISSION" and "0" set in "TRANSMISSION POSSIBLE" of the terminal apparatus B and "3" set in "SOURCE OF TRANSMISSION" and "0" set in "TRANSMISSION POSSIBLE" of the terminal apparatus E, as shown in the table of FIG. 22. It is to be noted that the reason for providing the column of "TRANSMISSION POSSIBLE" in the present example is to prohibit a double relay or a relay of a relay; however, it is to be also noted that such a double relay may be accepted in some applications, if desired.

Based on the thus formed relay control list shown in FIG. 22, it is so controlled that, for a terminal apparatus serving as a relay station for receiving information from the present terminal apparatus serving as a transmitting station, not only transmission document information, but also relay information including the address information of a final destination terminal apparatus are transmitted, for a terminal apparatus serving as a final destination and not as a relay station for receiving information from the present terminal apparatus serving as a transmitting station, only transmission document information is transmitted, and for a terminal apparatus to which the present terminal apparatus does not become a transmitting station, no information is transmitted.

Described more in detail with reference to the table shown in FIG. 22, for the terminal apparatus C, the present terminal apparatus A transmits not only transmission document information, but also relay information, such as the address information of the terminal apparatus B. For the terminal apparatus D, transmission document information as well as relay information, such as the address information of the terminal apparatus E, are transmitted. In addition, for the terminal apparatuses B and E, the present terminal apparatus A does not transmit anything because they receive information as relayed from the terminal apparatuses C and D, respectively. In this case, the relay information is transmitted as part of a document to be transmitted. The relay information may include the information as to the type of the final destination terminal apparatus (communication mode information) in addition to the address information.

Figure 23:
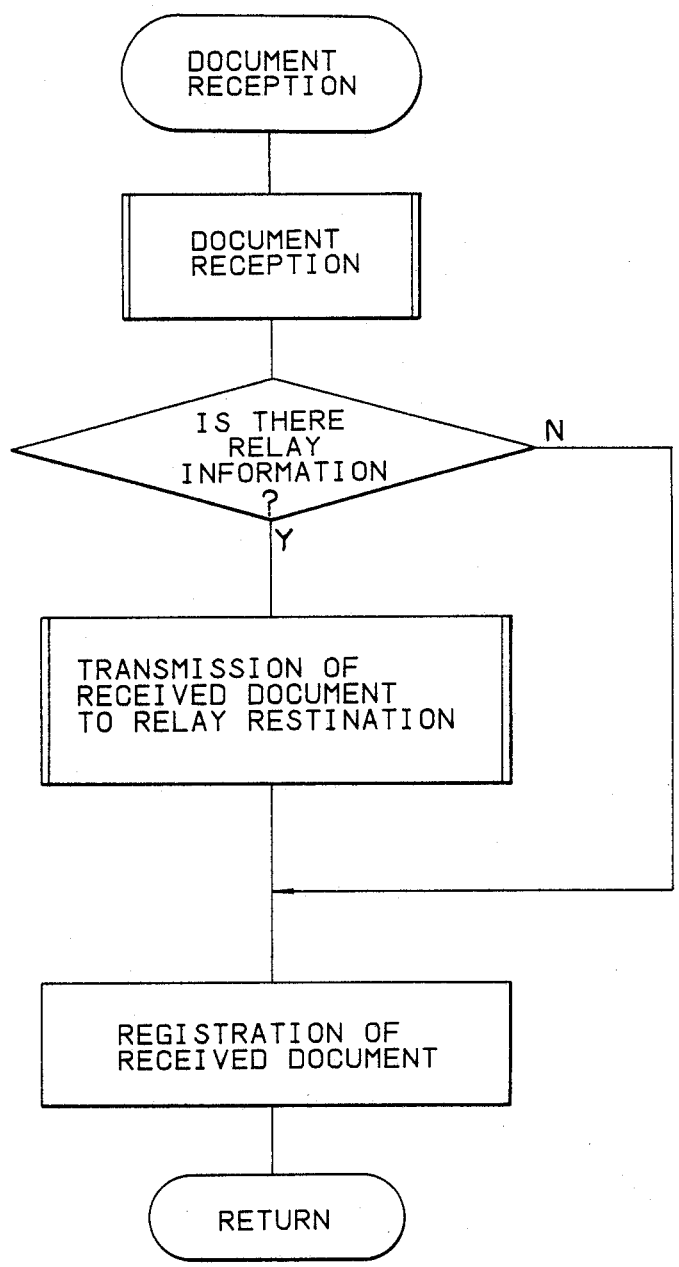
FIG. 23 is a flow chart showing document reception processing to be implemented by the structure shown in FIGS. 17a and 17b.
Figure 24:
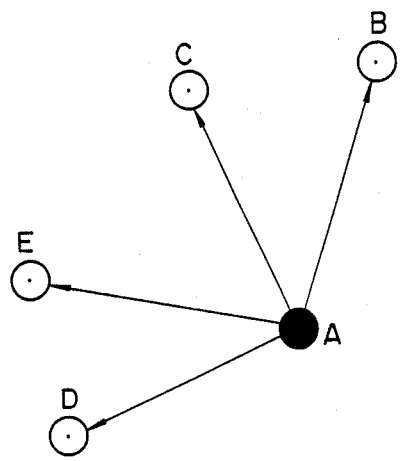
FIGS. 24 and 27 are schematic illustrations which are useful for understanding the advantages of the second aspect of the present invention over the prior art.
Figure 25:
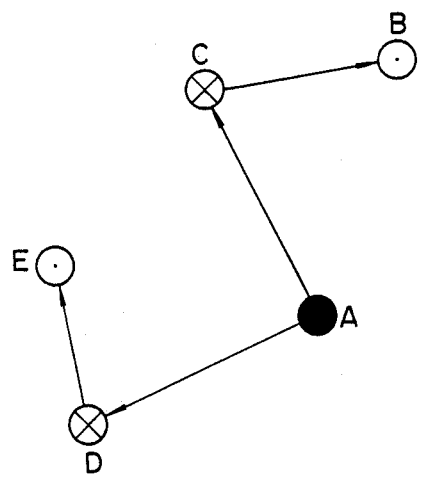

Next, the document reception processing operation will be described with reference to FIG. 23. In the first place, after receiving the document transmitted from a transmitting station and having it temporarily stored in a reception memory constituting the communication memory, it is examined whether or not the received document contains relay information. In this case, if relay information is contained, transmission information is formed by extracting selected information, such as the address information of the relayed or final destination terminal apparatus, from the relay information. Then, after transferring the received document stored in the reception memory to a transmission memory defining part of the transmission memory, the received document information is transmitted to the final destination terminal apparatus. Thereafter and also in the case where no relay information is not contained, the received document is stored into a document file.

Next, the processing of transmission and reception of a document by the system control unit 9 and the communication control unit 11 will be described in detail below. It should be noted that, in the present embodiment, relay designation information is also transmitted so as to determine whether or not the receiving station is a terminal apparatus having a relay function prior to the transmission of a document. It is so structured that the relay control is carried out after storing the received document into the side of the system control unit 9.

In the first place, the transmission preparation processing operation will be described in detail with particular reference to FIG. 9 (SCU side) and FIG. 10 (CCU side). In this transmission preparation processing operation, the system control unit (SCU) 9 supplies transmission information, such as the address (telephone number) of a designated destination, the name of a document to be transmitted, time of transmission, and transmission information including the before-mentioned relay information if broadcast transmission has been designated, to the communication control unit (CCU) 11. On the other hand, in accordance with a predetermined command from the SCU 9, the CCU 11 initiates the implementation of the sequence shown in FIG. 10, thereby receiving the transmission information supplied from the SCU 9 and have it stored in the internal memory. If the CCU is not in a condition to receive information from the SCU because, for example, of the CCU 11 being currently in the middle of document transmission with another communication terminal apparatus, the operation, such as transmission and reception of the transmission information with the SCU 9, is temporarily halted to be set in a stand-by status until the current communication is completed.

Thereafter, the SCU 9 requests a transmission file No. to the CCU 11 which the supplies a predetermined transmission file No. in response to this request. This transmission file No. is a file No. for internal processing. Here, use is made of "TDOC-XXX" which indicates the teletex mode. Upon receipt of the transmission file No. from the CCU 11, the SCU 9 reads the apparatus type information of the designated destination registered in the address list to determine whether or not it is a facsimile mode (mode F). Under the condition, if the transmission mode is mode F, then the SCU 9 changes the transmission file No. received from the CCU 11 from "TDOC-XXX" indicating teletex mode to "FDOC-XXX" indicating facsimile mode and supplies it to the CCU 11. Then, the transmission document of the document name designated for transmission is read out of the FDD 8, and, after adding the changed file No. "FDOC-XXX" to the document, it is registered in the transmission file defined by the HDD 7.

On the other hand, if the transmission mode is not mode F, then it is checked whether or not it is a private mode (mode P). If the transmission mode is mode P, then the SCU 9 changes the transmission file No. received from the CCU 11 from "TDOC-XXX" indicating the teletex mode to "PDOC-XXX" indicating the private mode and supplies the changed file No. to the CCU 11. Then, the transmission document of the document name designated for transmission is read out of the FDD 8, and, after adding the changed file No. of "PDOC-XXX" to the document, it is registered in the transmission file defined by the HDD 7.

In this case, if the relay information has been added to the transmission document, the relay information is added to a predetermined page, e.g., page 1, of the transmission document of the transmission document name, and, then, this transmission document with added information is stored as a transmission document in the transmission file.

On the other hand, if the transmission mode is not mode P and mode T of teletex mode, then the transmission document of the designated document name is read out of the FDD 8 and the file No. "TDOC-XXX" of teletex mode received from the CCU 11 is added to the document thus read out and registered in the transmission file. If the CCU 11 receives the transmission file No. from the SCU 9, it changes the transmission file No. supplied to the SCU 9 to the transmission file No. received from the SCU 9 and has it registered.

Next, the transmission processing operation to be carried out by the system control unit 9 and the communication control unit 11 will be described in detail with reference to FIGS. 11a-11b and 12a-12b.

The communication control unit (CCU) 11 sets the transmission status ON, i.e., requesting transmission, when the time has come if the transmission time has been designated, or immediately if no specific transmission time has been designated. On the other hand, the system control unit (SCU) 9 checks to see whether the transmission status has become ON by polling the CCU 11 at a predetermined time interval, and when the transmission status has become ON, i.e., upon request for transmission, the SCU 9 requests the CCU 11 the transmission file No. for transmission. On the other hand, upon receipt of request of transmission file No., the CCU 11 supplies a tranmission file No. to the SCU 9 and waits for a further command from the SCU 9. Under the condition, the SCU 9 determines the transmission file No. received from the CCU 11 to be either one of "FDOC-XXX", "PDOC-XXX", and "TDOC-XXX", thereby determining the transmission mode to be either one of mode F (facsimile mode), mode P (private mode), and mode T (teletex mode).

If the transmission file No. has been found to be a transmission file No. of mode F, then a mode F transmission document command is supplied to the CCU 11;

in the case of a transmission file No. of mode P, a mode P transmission document command is supplied to the CCU 11; and in the case of a transmission file No. of mode T, a mode T transmission document command is supplied to the CCU 11. Thus, the CCU 11 determines the command received from the SCU 9 to be a transmission document command of either one of mode F, mode P or mode T, and depending on the result of this determination, the CCU 11 carries out a network connecting processing operation with a transmitting (receiving) terminal apparatus in accordance with the facsimile communication procedure, private communication procedure added to the teletex communication regulations, or teletex communication procedure. Then, when communication is made possible, for example, by establishing a connection with another terminal apparatus through the network, the transmission document supply and reception processing operation is carried out between the SCU 9 and the CCU 11 so that the transmission document information is supplied from the SCU 9 to the CCU 11 in accordance with the selected transmission mode (mode F, P or T).

In the case of mode F, the SCU 9 changes the transmission document information from the character code into image data, for example, by using the bit map memory of the CRTCU 10, and, then, the image data is further converted into compression code according to the facsimile communication regulations. Thus converted compression code is then supplied to the CCU 11. In the case of mode P, the SCU 9 supplies the transmission document information to the CCU 11 without change; whereas, in the case of mode T, the transmission document information is converted into data in compliance with a teletex terminal apparatus, and, then, the thus converted data is supplied to the CCU 11. Thereafter, the CCU 11 transmits the transmission document information received from the SCU 9 to a destination terminal apparatus in accordance with the transmission mode (mode F, P or T).

Upon completion of supply of the transmission document to the CCU 11 or in the case of the condition of transmission impossible, the SCU 9 immediately carries out a transmission termination processing operation, and, then, the CCU 11 carries out the transmission termination processing operation upon completion of transmission of the transmission document to the destination terminal apparatus or in the case of being incapable to establish a connection through network, thereby completing a series of processing operations.

Now, the transmission of relay information will be described in detail below.

As well known in the art, the communication protocol in teletex has a seven-layered structure, including a physical layer (layer 1) for physical conditions, such as MODEM and pin arrangement, a link layer (layer 2) for a communication control procedure, a network layer (layer 3) for a routine control within network, a transport layer (layer 4) for absorbing the differences in network, a session control layer (layer 5) and a document control layer (layer 5) as a session layer for transmission and reception control of data or the like, a presentation layer (layer 6) for encoding of data, formatting, or the like. In the present communication terminal apparatus, the communication control unit 11 takes care of layers 1 through 5 and a part of layer 6, and the system control unit 9 takes care of the rest of layer 6. And, various commands and responses necessary to implement the session and document controls are defined in the session control and document control layers within the session layer.

In the present embodiment, relay designation information is added in session start (CSS) and session start confirmation (RSSP) which is a command and response used in the session control layer, to which a privately used parameter can be added. Alternatively, use may also be made of a command and response, such as document function list (CDCL) and document function list confirmation (RDCLP) which is used in the document control layer and which allows to use a privately used parameter. In addition, as described before, such relay information as the final destination address information and the transmission mode information (i.e., apparatus type information) is transmitted as a part of the document. In this case, the relay information is always stored on a predetermined page (here, page 1) of the document. Thus, in the transmission document supply and reception processing operation in mode P in FIGS. 11a-11b and 12a-12b, the relay information is supplied from the system control unit 9 to the communication control unit 11 as a transmission document and it is transmitted to the destination communication terminal apparatus.

It is to be noted that the processing operation of the present communication terminal apparatus of this aspect of the present invention at the time of reception is the same as described in detail below with reference to FIG. 13 (CCU side), FIG. 14 (SCU side) and FIG. 15, so that the reference should be made to the previous description in this respect and the repetition of description is avoided.

Figure 26:
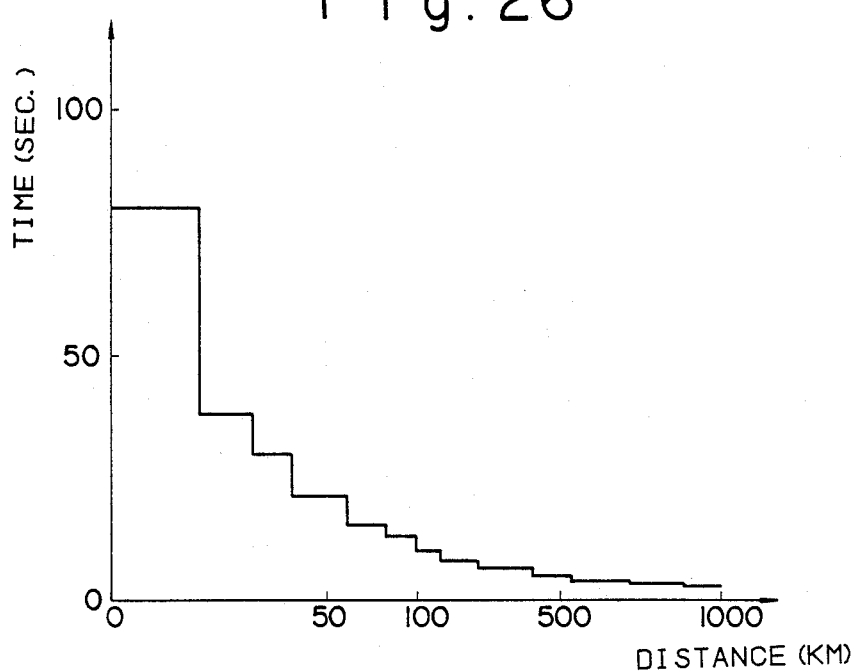
Figure 27:
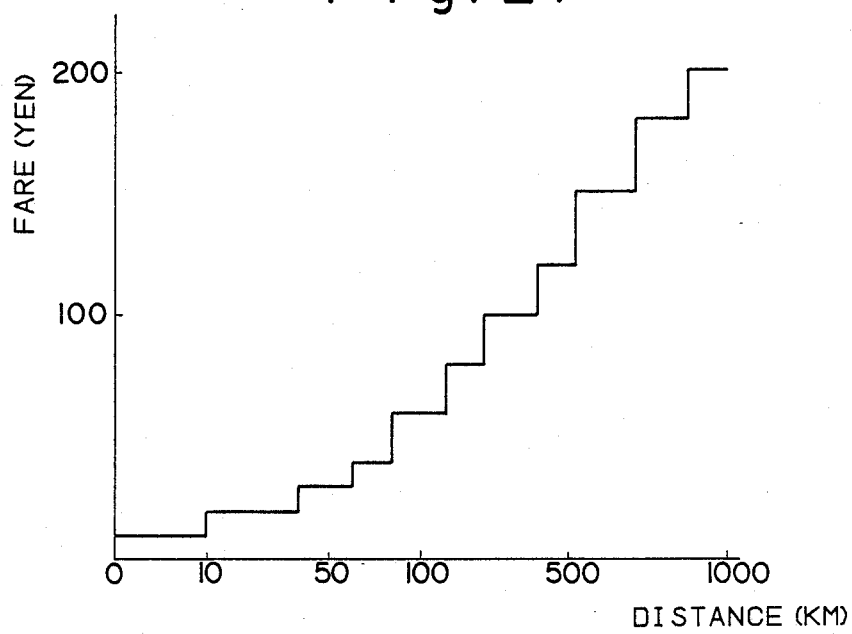

As described above, when the same document is to be transmitted from the terminal apparatus A to the four terminal apparatuses B through E, if the document is transmitted from the source terminal apparatus A individually to the respective terminal apparatuses B through E, the total transmission length required is 1,036 km; whereas, if the document is transmitted using the terminal apparatuses C and D as relay stations, then the total transmission length required is 780 km which is significantly shorter than the former case. In Japan, the relation between the distance and the time period for communication allotted for unit fare ( 10 in Japan) is as shown in FIG. 26 and the relation between the distance and the communication fare per unit time (1 minute) is as shown in FIG. 27, so that the shorter the distance between the transmitting and receiving stations, the lower the communication fare and also the shorter the network use time. Moreover, using a communication terminal apparatus having various communication modes as a relay station, a communication between the source and destination terminal apparatuses which are of different type can be carried out.

As described above, in the present document processing communication terminal apparatus, it is so structured that, when broadcast communication is designated, relay information is transmitted to a relay station based on the relay terminal information. Thus, the communication efficiency can be remarkably enhanced by using the present communication terminal apparatus. Moreover, since an optimum communication terminal apparatus is automatically selected as a relay station when broadcast communication is designated, the operability is also significantly enhanced. As set forth before, by providing a data conversion function for converting the format of received document information in accordance with the type of the terminal apparatus serving as a destination station, the document can be transmitted from the source station to the destination station using the presence terminal apparatus as a relay station. In the above-described embodiment, it is so structured that relay stations are selected from those terminal apparatuses for which broadcast communication has been designated. It is to be noted, however, that the present invention should not be limited only to this and it may also be so structured that one or more of relay stations are selected from all of the terminal apparatuses having a relay function. It should also be noted that the application of the present communication terminal apparatus is not limited only to an apparatus having all of the above-described teletex, private and facsimile modes. The present communication terminal apparatus may also be applied to various other terminal apparatuses, including facsimile apparatuses, teletex apparatuses, communication word processors and personal computers.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A document processing terminal apparatus including a display and inputting means wherein said apparatus is capable of transmitting document information through a transmission line to a remote place, comprising:

means in said apparatus, for storing a destination file representative of each of a plurality of communication terminal apparatuses, said destination file including address information and terminal type information wherein said terminal type information includes facsimile, teletex and private teletex;

transmission condition setting means for setting a transmission mode of said apparatus, said transmission mode including a relay mode;

designating means for designating a relay communication terminal apparatus for relaying document information and also a destination communication terminal apparatus to which said document information is to be finally transmitted through said relay communication terminal apparatus;

relay control file forming means for forming a relay control file from the address information and terminal type information of said destination based on the designation of said destination communication terminal apparatus by said designating means and said destination file; and transmitting means for transmitting document information;

whereby, when said relay mode is set by said transmission condition setting means, said transmitting means transmits said relay control file to a terminal apparatus acting as a relay communication terminal apparatus, together with said document information.

2. A document processing terminal apparatus including a display and inputting means wherein said apparatus is capable of transmitting document information through a transmission line to a remote place, comprising:

means in said apparatus for storing a destination file of each of a plurality of communication terminal apparatuses, said destination file including address information and charge information regarding charge between any two of said plurality of communication terminal apparatuses;

transmission condition setting means for setting a transmission mode of said apparatus, said transmission mode including a relay mode;

designating means for designating a destination communication terminal apparatus to which said document information is to be transmitted;

relay control file forming means for forming a relay control file which determines if one or more of said plurality of communication terminal apparatus should act as relay stations and an order of transmitting said document information through said one or more relay stations in order to minimize the charge for transmitting said document information to said destination communication terminal apparatus based on the designation of said destination communication terminal apparatus by said designating means and said destination file; and transmitting means for transmitting document information;

whereby, when said relay mode is set by said transmission condition setting means, said transmitting means transmits said document information to a destination communication control apparatus designated by said designating means in accordance with said relay control file.

3. The apparatus of claim 2, wherein said charge information is distance information between any two of said plurality of communication control apparatuses, whereby said relay control file is formed such that the distance to said destination communication terminal apparatus is minimized.

* * * * *